(12) United States Patent
Takahashi et al.

(10) Patent No.: US 12,537,407 B2
(45) Date of Patent: Jan. 27, 2026

(54) ROTATING ELECTRICAL MACHINE, ELECTRIC WHEEL, AND VEHICLE

(71) Applicant: Hitachi, Ltd., Tokyo (JP)

(72) Inventors: Akeshi Takahashi, Tokyo (JP); Tetsuya Suto, Tokyo (JP); Makoto Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 18/039,772

(22) PCT Filed: Oct. 20, 2021

(86) PCT No.: PCT/JP2021/038839
§ 371 (c)(1),
(2) Date: Jun. 1, 2023

(87) PCT Pub. No.: WO2022/137765
PCT Pub. Date: Jun. 30, 2022

(65) Prior Publication Data
US 2024/0039355 A1    Feb. 1, 2024

(30) Foreign Application Priority Data
Dec. 22, 2020  (JP) ................................. 2020-212594

(51) Int. Cl.
*H02K 3/28*   (2006.01)
*B21D 28/26*  (2006.01)
(Continued)

(52) U.S. Cl.
CPC ............... *H02K 3/28* (2013.01); *B21D 28/26* (2013.01); *B60L 50/51* (2019.02);
(Continued)

(58) Field of Classification Search
CPC ..................................................... H02K 3/14
(Continued)

(56) References Cited

U.S. PATENT DOCUMENTS 6,208,058 B1 *   3/2001   Taji ......................... H02K 3/50
                                                    310/201
10,938,279 B2 *  3/2021   Stieger .................... F01D 15/10
(Continued)

FOREIGN PATENT DOCUMENTS

JP     4300716 B2    7/2009
JP     2012-29443 A   2/2012
(Continued)

OTHER PUBLICATIONS

Extended European Search Report issued in European Application No. 21909922.3 dated Oct. 25, 2024 (8 pages).
(Continued)

*Primary Examiner* — Oluseye Iwarere
*Assistant Examiner* — Minki Chang
(74) *Attorney, Agent, or Firm* — Crowell & Moring LLP

(57) ABSTRACT

A rotating electrical machine includes segmented coils respectively disposed in layers aligned in a row in a radial direction inside a slot of a stator core. The segmented coils include first regions having a straight line section disposed inside the slot and a protrusion protruding to the outside of the slot from one end of the straight line section, and second regions extending toward one side in the circumferential direction from the other end of the respective straight line section, such that the position in the radial direction changes. The tip end section of the second region of a first segmented coil disposed in a prescribed layer within a prescribed slot is disposed and connected to be adjacent, in the radial direction, to the tip end section of the first region of a second segmented coil disposed in the prescribed layer within a slot adjacent to the prescribed slot.

14 Claims, 22 Drawing Sheets

(51) Int. Cl.
  *B60L 50/51* (2019.01)
  *H02K 15/0407* (2025.01)
  *H02K 15/35* (2025.01)
(52) U.S. Cl.
  CPC ......... *H02K 15/0407* (2013.01); *H02K 15/35* (2025.01); *B60L 2210/40* (2013.01)
(58) Field of Classification Search
  USPC .................................................. 310/202, 207
  See application file for complete search history.

(56) References Cited

U.S. PATENT DOCUMENTS

| | | | |
|---|---|---|---|
| 2004/0046475 A1* | 3/2004 | Holzheu | .................. H02K 3/28 310/201 |
| 2011/0198953 A1 | 8/2011 | Shinohara et al. | |
| 2017/0008385 A1* | 1/2017 | Fujimoto | .................. H02K 7/14 |
| 2017/0133899 A1 | 5/2017 | Fukuda et al. | |
| 2020/0169137 A1 | 5/2020 | Tang et al. | |

FOREIGN PATENT DOCUMENTS

| | | |
|---|---|---|
| WO | WO 2011/102150 A1 | 8/2011 |
| WO | WO 2016/021451 A1 | 2/2016 |

OTHER PUBLICATIONS

International Search Report (PCT/ISA/210) issued in PCT Application No. PCT/JP2021/038839 dated Dec. 21, 2021 with English translation (4 pages).
Japanese-language Written Opinion (PCT/ISA/237) issued in PCT Application No. PCT/JP2021/038839 dated Dec. 21, 2021 (3 pages).
International Preliminary Report on Patentability (PCT/IB/338 & PCT/IB/373) issued in PCT Application No. PCT/JP2021/038839 dated Jul. 6, 2023, including English translation of document C2 (Japanese-language Written Opinion (PCT/ISA/237), filed on Jun. 1, 2023) (5 pages).

* cited by examiner

| WINDING METHOD | COIL END OF STATOR (SECTIONAL VIEW FROM AXIAL DIRECTION) | COIL END WEIGHT | WINDING COEFFICIENT (~TORQUE) | TORQUE PULSATION |
|---|---|---|---|---|
| DISTRIBUTED WINDING |  | × LARGE | ○ Max. 1.0 | ○ SMALL |
| CONCENTRATED WINDING (2-POLE 3-SLOT SERIES) |  | ○ SMALL | × 0.866 | × LARGE |
| CONCENTRATED WINDING AND FRACTIONAL SLOTS (8-POLE 9-SLOT SERIES) |  | ○ SMALL | ○ 0.945 | ○ SMALL |

ROTATING ELECTRICAL MACHINE, ELECTRIC WHEEL, AND VEHICLE

TECHNICAL FIELD

The present invention relates to a rotating electrical machine, an electric wheel, and a vehicle.

BACKGROUND ART

In recent years, in order to increase the output of a rotating electrical machine, a method of increasing torque by applying a large current to a coil has been adopted. In this method, it is important to suppress a Joule loss (hereinafter, copper loss) generated in a coil by increasing a cross-sectional area of the coil without increasing a size of a rotating electrical machine. For example, in a rotating electrical machine used for driving an automobile or the like, a square wire is used to improve a space factor of a coil in a slot of a stator, and thus it is possible to reduce a copper loss and improve efficiency of the rotating electrical machine.

Winding methods of a stator coil are roughly divided into distributed winding and concentrated winding. In a rotating electrical machine using a square wire as a stator coil, distributed winding is often employed. A rotating electrical machine having distributed winding is superior compared with a rotating electrical machine having concentrated winding in that a winding coefficient indicating the magnitude of an effective magnetic flux interlinking with a coil can be increased and a torque pulsation of the rotating electrical machine can be qualitatively reduced.

The rotating electrical machine having concentrated winding is superior compared with the rotating electrical machine having distributed winding in that a coil axial end (hereinafter, a coil end) can be reduced, and a winding coefficient and a torque pulsation greatly differ depending on a combination of the number of magnetic poles and the number of slots. For example, in a rotating electrical machine having concentrated winding in which the number of magnetic poles: the number of slots is 2:3 series, the winding coefficient and the torque pulsation deteriorate compared with a rotating electrical machine having distributed winding. In contrast, in a rotating electrical machine having concentrated winding in which the number of magnetic poles: the number of slots is 8:9 series, the winding coefficient and the torque pulsation can be improved to be equal to or more than those in a rotating electrical machine having distributed winding.

PTL 1 discloses a rotating electrical machine in which stator coils are mounted on a stator core in a concentrated winding manner. The rotating electrical machine having concentrated winding disclosed in PTL 1 has a structure in which each turn of a stator coil wound around teeth in a square shape is configured with two conductor pieces, and the stator coils are spirally laminated by sequentially joining the conductor pieces.

CITATION LIST

Patent Literature

PTL 1: JP 4300716 B

SUMMARY OF INVENTION

Technical Problem

However, in the technique disclosed in PTL 1, since a coil is wound around one tooth in a square shape, a dead space is formed between circumferentially adjacent conductors in a slot (see FIG. 1 of PTL 1). As the dead space becomes larger, the space factor of the coil in the slot decreases. Therefore, in the technique disclosed in PTL 1, it is difficult to improve the efficiency and output of the rotating electrical machine without increasing the size of the rotating electrical machine, and thus there is room for improvement in this respect.

An object of the present invention is to improve the efficiency and output of a rotating electrical machine without increasing a size of the rotating electrical machine.

Solution to Problem

The present invention includes various embodiments, and as an example thereof, a rotating electrical machine of the present invention includes a stator including a stator core having a plurality of slots and a plurality of segment coils respectively disposed in the plurality of slots of the stator core, in which the plurality of segment coils are respectively disposed in a plurality of layers arranged in a line in a radial direction in the slot, the plurality of segment coils include a first segment coil disposed in a predetermined slot and a second segment coil disposed in an adjacent slot adjacent to the predetermined slot, each of the first segment coil and the second segment coil includes a first region having a linear portion disposed in the slot and a projection protruding from one end side of the linear portion to an outside of the slot, and a second region formed to extend from the other end side of the linear portion toward one side in the circumferential direction and change in a position in the radial direction outside the slot on the other end side of the linear portion, and a second end that is a tip of the second region of the first segment coil is disposed to be adjacent to a first end that is a tip of the first region of the second segment coil disposed in the same layer as a layer of the first segment coil in the radial direction, and is connected to the first end of the second segment coil.

Advantageous Effects of Invention

According to the present invention, it is possible to improve the efficiency and output of the rotating electrical machine without increasing the size of the rotating electrical machine.

DESCRIPTION OF EMBODIMENTS

Embodiments of the present invention will be described with reference to the drawings. In the following description, the same constituents are denoted by the same symbols.

Functions of the constituents denoted by the same symbol are basically the same. In the present specification, "one coil winding" means one cycle of one winding or wave winding per tooth. In a case where a coil of one winding is configured with a plurality of conductor pieces, each conductor piece is referred to as a segment coil. A configuration in which a coil is wound four times around one tooth is expressed as a coil including four layers. In the present specification, "one set of coils" means the entire coil wound around one tooth.

Hereinafter, an example in which a rotating electrical machine to which the present invention is applied is a variable-speed drive rotating electrical machine used for automobiles, railway vehicles, and the like will be described, but the present invention may be applied to a constant-speed drive rotating electrical machine. The rotating electrical machine to which the present invention is applied only needs to have a configuration of concentrated winding and fractional slots that will be described later, and the number of adjacent continuous coils per phase may be two or more, and the rotating electrical machine may be a permanent magnet synchronous machine or another rotating machine. A combination of the number of magnetic poles and the number of slots (hereinafter, it is referred to as a pole slot combination) may be any combination as long as the rotating electrical machine has a configuration of concentrated winding and fractional slots. The present invention can be applied to both a rotating electrical machine including an inner-rotation-type rotor and a rotating electrical machine including an outer-rotation-type rotor. A material of a stator coil of the rotating electrical machine to which the present invention is applied may be copper, aluminum, or any of other conductive materials. An example in which the plurality of segment coils configuring the stator coil is a single conductor (component) having a rectangular cross-sectional shape will be described, but the present invention is not limited thereto. For example, the segment coils may be formed by aligning or molding a plurality of conductor wires such as round wires.

Embodiment 1

Figure 18:
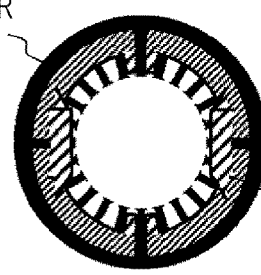
FIG. 18 is a comparative explanatory diagram of a winding method of a rotating electrical machine.
Figure 18:
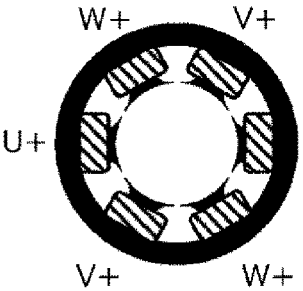
Figure 18:
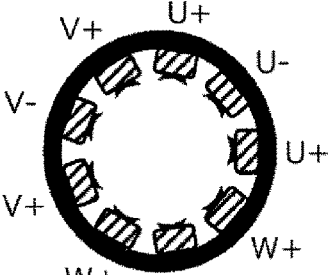

A winding method of a rotating electrical machine according to the present embodiment will be described in comparison with the related art. FIG. 18 is a comparative explanatory diagram of a winding system of a rotating electrical machine. As illustrated in FIG. 18, a winding method of a stator coil of a rotating electrical machine includes a distributed winding method in which stator coils are wound around slots and separated across a plurality of slots, and a concentrated winding method in which stator coils are spirally wound around one tooth.

As described above, the rotating electrical machine having distributed winding is superior compared with the rotating electrical machine having concentrated winding in that a winding coefficient indicating the magnitude of an effective magnetic flux interlinked with a coil can be increased and a torque pulsation of the rotating electrical machine can be qualitatively reduced. The rotating electrical machine having concentrated winding is superior compared with the rotating electrical machine having distributed winding in that a coil end can be reduced, and a winding coefficient and a torque pulsation greatly differ depending on a combination of the number of magnetic poles and the number of slots. For example, in a rotating electrical machine having concentrated winding in which the number of magnetic poles: the number of slots is 2:3 series, the winding coefficient and the torque pulsation deteriorate compared with a rotating electrical machine having distributed winding. In contrast, in a rotating electrical machine having concentrated winding in which the number of magnetic poles: the number of slots is 8:9 series, the winding coefficient and the torque pulsation can be improved to be equal to or more than those in a rotating electrical machine having distributed winding.

The definition of the rotating electrical machine having concentrated winding and fractional slots will be described below by using the number of slots q per pole and per phase. In the rotating electrical machine having the number of phases m, when the number of magnetic poles is denoted by P and the number of slots is denoted by Ns, the number of slots q per pole and per phase is expressed by the following Equation (1).

$$q=Ns/m/P \qquad (1)$$

In concentrated winding with the number of phases m=3, q is 0.5 in a 2-pole 3-slot structure. In the present embodiment, a rotating electrical machine in which the number of slots q per pole and per phase is smaller than 0.5 (q<0.5) will be referred to as a rotating electrical machine having concentrated winding and fractional slots.

The rotating electrical machine according to the present embodiment has a configuration in which the number of adjacent continuous coils X per phase is two or more (X≥2). The number of adjacent continuous coils X per phase is expressed by the following Equation (2) by using the number of magnetic poles P and the number of slots Ns.

$$X=Ns/(m\cdot|Ns-P|) \qquad (2)$$

In a case where the rotating electrical machine has, for example, an 8-pole 9-slot structure, X=3 is obtained from Equation (2), and it can be seen that U-phase coils are continuously disposed on three teeth adjacent to each other. The same applies to a V phase and a W phase. As described above, in the rotating electrical machine having the concentrated winding and the fractional slots, it can be seen that the in-phase coils are continuously disposed on adjacent teeth in most of combinations of the pole slot combinations.

For example, in a case where a configuration of the rotating electrical machine is an 8-pole 9-slot series, three sets of U-phases are continuously disposed in the circumferential direction as illustrated in the sectional view of the lower part of FIG. 18. Similarly, three sets of the V-phase and the W-phase are continuously disposed. The present inventors have focused on a configuration in which two or more sets of in-phase coils are continuous in the circumferential direction (that is, the configuration in which the number of adjacent continuous coils X per phase shown in Equation (2) is two or more), and have found a winding structure capable of improving a space factor of the coils in the slot (a ratio of a cross-sectional area of the coils to a cross-sectional area of the slot).

Figure 19A:
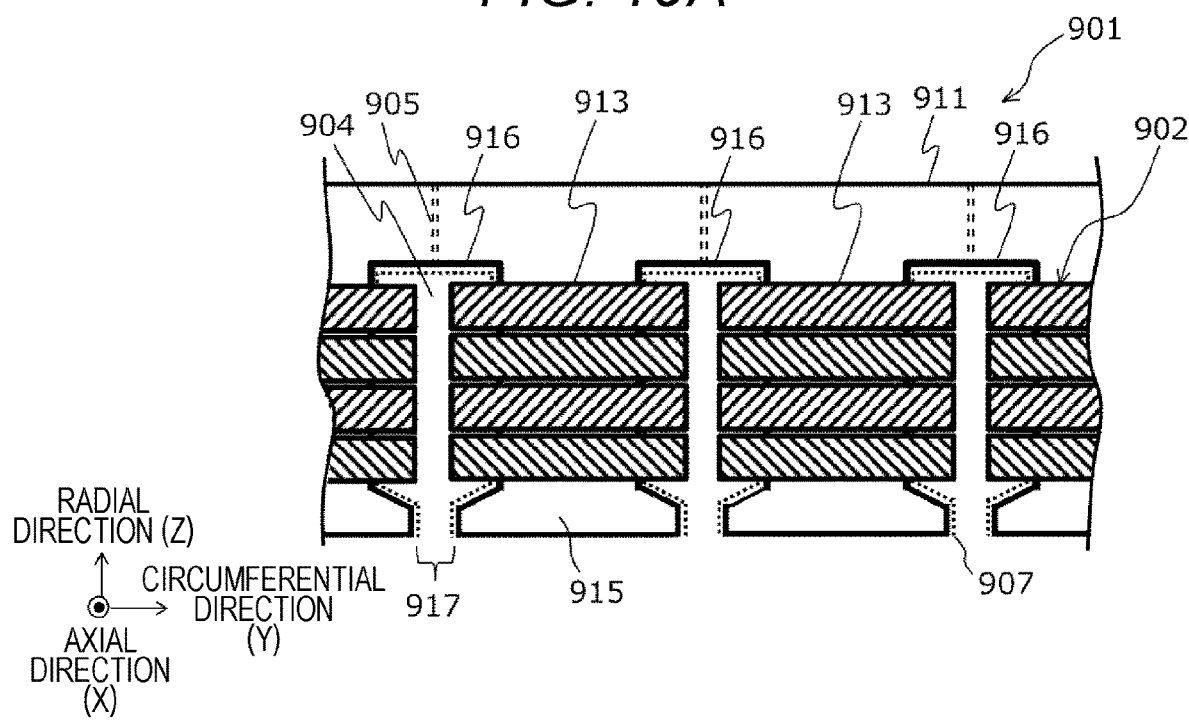
FIG. 19A is a partial plan view of a stator coil according to the related art as viewed from an axial direction.
Figure 19B:
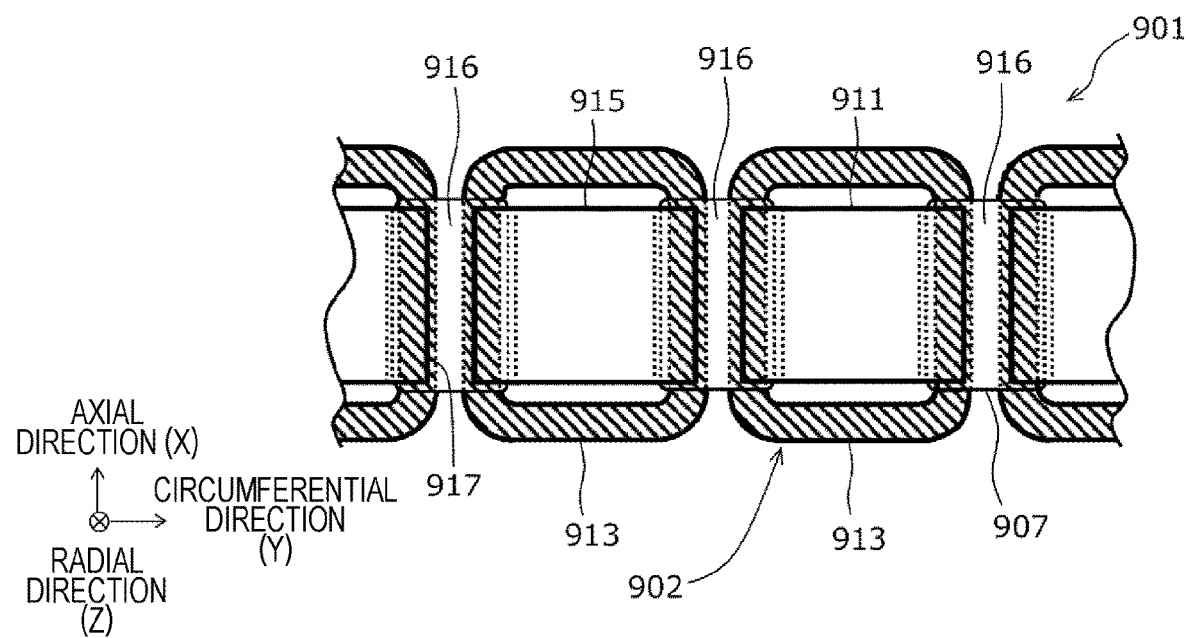
FIG. 19B is a partial side view of the stator coil according to the related art as viewed from the radial direction.

With reference to FIGS. 19A and 19B, a configuration and a problem of concentrated winding of the related art will be described. FIG. 19A is a partial plan view of a stator coil 902 according to the related art as viewed from an axial direction, and FIG. 19B is a partial side view of the stator coil 902 according to the related art as viewed from a radial direction (slot opening 917 side). As illustrated in FIGS. 19A and 19B, a stator 901 according to the related art includes a cylindrical stator core 911 and a stator coil 902 attached to the stator core 911. Although the stator 901 has a cylindrical shape, the stator 901 is schematically illustrated in a linear shape in FIGS. 19A and 19B.

A plurality of teeth 915 are formed in the stator core 911, and slots 916 are formed between the teeth 915. The stator core 911 is divided into a plurality of parts in the circumferential direction. In other words, the stator core 911 is configured by disposing a plurality of split cores in the circumferential direction, and a split core joint 905, which is a boundary surface between the split cores adjacent to each other, is formed between the split cores. An insulation material 907 is attached to the slot, and the coil 913 of concentrated winding is attached to each of the plurality of teeth 915 via the insulation material 907. The coil 913 is formed by spirally winding a conductive wire around the teeth 915. The plurality of coils 913 are connected to each other via a connection wiring (hereinafter, crossover wires) provided at the coil end. The stator coil 902 is formed by connecting the plurality of coils 913 via the crossover wires.

As a method of winding conductive wires around the teeth 915 according to concentrated winding, there is a method of sequentially winding conductive wires from a winding nozzle (not illustrated) around the teeth 915. In this method, in order to secure a spatial movable space of the winding nozzle, an unnecessary dead space 904 is formed in the slot 916 (see FIG. 19A). As a method of manufacturing the stator 901 in which the dead space 904 is made as small as possible, there is also a method of manufacturing the stator 901 by winding conductive wires around a split core obtained by dividing the stator core 911 for each tooth 915 according to concentrated winding and assembling a plurality of split cores around which the conductive wires are wound. However, in this method, at the time of assembling the split cores, the coils 913 come into contact with each other and are rubbed, and an insulation film of the coil 913 is damaged, which may cause dielectric breakdown. Thus, in the method of manufacturing the stator 901 by assembling the divided cores, it is necessary to secure a space for the purpose of avoiding contact between the divided cores, and this space is the dead space 904. As described above, in the rotating electrical machine having concentrated winding according to the related art, since the dead space 904 is formed, there is a limit to an increase (that is, an increase in a conductor cross-sectional area) in a space factor of the coil 913 in the slot 916. In the stator 901 manufactured according to the split core method, there is also a problem that magnetic characteristics deteriorate due to the formation of the core joint 905, and output of the rotating electrical machine is lowered.

In a case where the rotating electrical machine is driven at a high speed and a high frequency, it is desirable to form the coil 913 with a flat copper wire (a square wire or the like) in order to reduce an AC copper loss generated in the coil. However, in a case where the coil 913 is formed by using the winding nozzle, it is difficult to wind a flat copper wire (square wire or the like) around the teeth 915, and there is also a problem that it is difficult to reduce the AC copper loss. In the rotating electrical machine having concentrated winding according to the related art, there is also a problem that a size of the rotating electrical machine is large since a disposition space of the crossover wires connecting the coils 913 wound around the teeth 915 are secured axially outside of the stator core 911.

In contrast, the rotating electrical machine according to the present embodiment solves the above problem on the basis of the following concept.

(First Concept)

Although it is desired to use a flat copper wire for the stator coil from the viewpoint of reducing the AC copper loss, there is a problem that it takes time and effort to form a coil end having a complicated shape and moldability is low. In a case of molding a copper wire inserted into a slot of a stator core, it is difficult to reduce the number of manufacturing steps and manufacturing cost of a rotating electrical machine. Therefore, the present inventors have devised a method of punching a coil from a conductor plate such as a copper plate. In this method, since the degree of freedom of a shape of a coil in two dimensions is high, a coil having a coil end having a complicated shape can be easily formed. Since it is not necessary to mold a part of the coil after punching work or after the coil is attached to the stator core, it is possible to reduce the number of manufacturing steps of the rotating electrical machine and simplify manufacturing equipment for the rotating electrical machine. As a result, the manufacturing cost of the rotating electrical machine can be reduced.

(Second Concept)

A stator core having an open slot structure is excellent from the viewpoint of ease of assembling a coil to the stator core, but a stator core having a semi-closed slot structure (a structure in which teeth protrude in a circumferential direction in a gap surface) is excellent from the viewpoint of reducing a torque pulsation. The semi-closed slot structure is a structure in which a flange protruding in the circumferential direction is provided at the tip of the tooth, and the open slot structure is a structure in which the flange is not provided. In a case where a stator core has a semi-closed slot structure in a rotating electrical machine having concentrated winding, conventionally, a conductive wire is wound around a tooth by using a winding nozzle or a coil of one winding is attached to a tooth of a split core, but in this method, there is a problem that it is difficult to increase a space factor of a coil in a slot by forming a dead space as described above. Therefore, the present inventors have devised a configuration in which coils of one winding are divided into segment coils for a rotating electrical machine having concentrated winding and fractional slots in which two or more sets of in-phase coils are continuous in the circumferential direction. As a result, a space factor of the coil in the slot can be increased compared with the related art, and high efficiency and high output of the rotating electrical machine can be achieved without increasing a size of the rotating electrical machine. By dividing the segment coils, the segment coils can also be attached to a rotating electrical machine having a semi-closed slot structure, and thus a torque pulsation can be reduced.

(Third Concept)

In order to ensure the reliability of a connection portion between segment coils, it is necessary to dispose the connection portion between the segment coils in a portion that can be visually inspected and can be physically accessed. It is necessary to eliminate crossover wires in order to achieve space saving. Therefore, the present inventors have devised a configuration in which a connection portion between segment coils is provided at a coil end terminal such that connection work can be easily performed from the axial direction or the radial direction of a stator. The present inventors have devised a configuration in which a conventional crossover wire for connecting coils wound around each tooth can be eliminated by connecting segment coils to each other to form a wavy coil and laminating and disposing a plurality of wavy coils in a radial direction of a stator. As a result, an operator such as an inspector or a maintenance operator can visually inspect the connection portion between the segment coils and can physically access the connection portion. As a result, the cost of the rotating electrical machine can be reduced. Since the crossover wire for connecting the coils wound around each tooth can be eliminated, the rotating electrical machine can be downsized.

Figure 1:
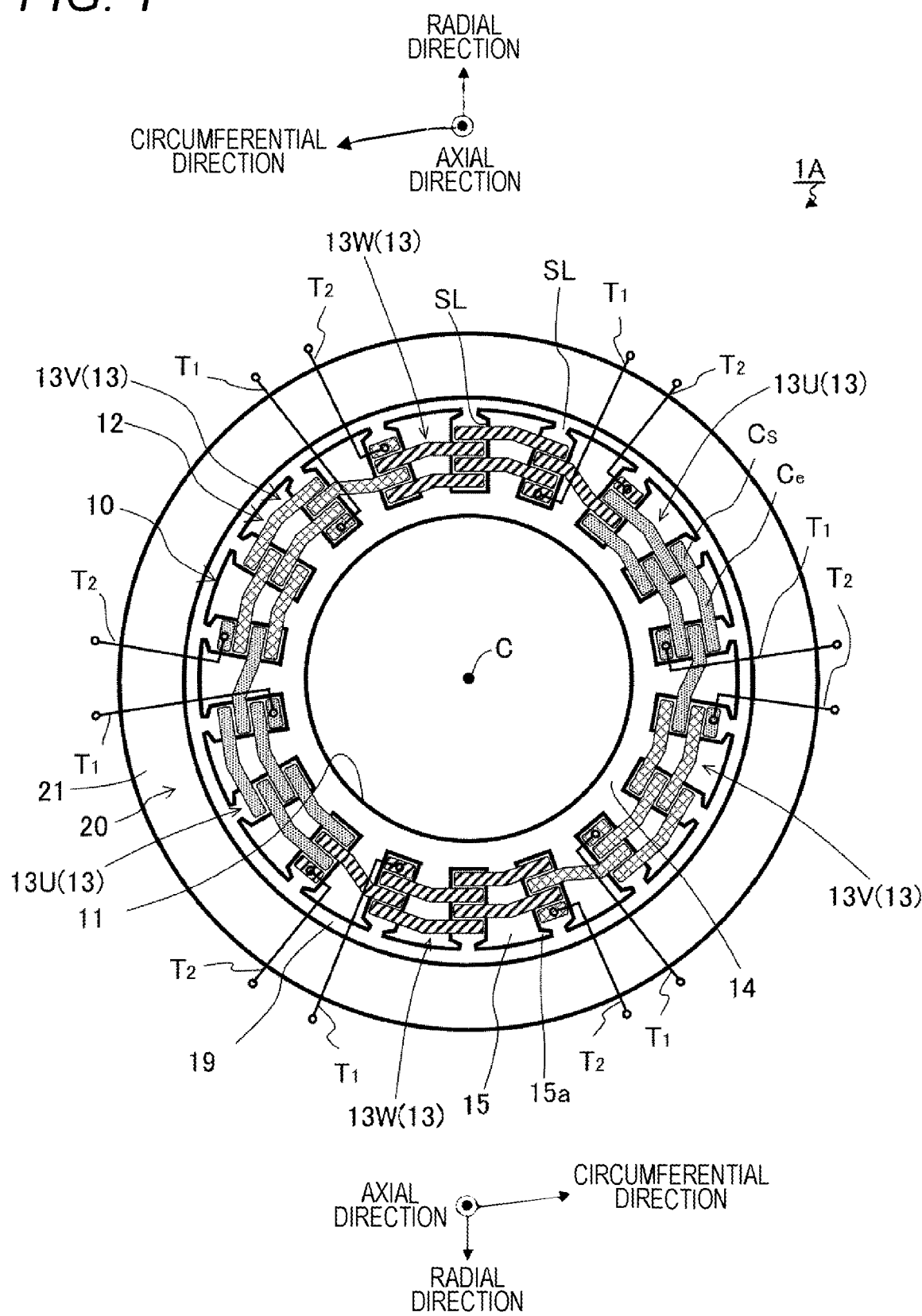
FIG. 1 is a schematic plan view of a rotating electrical machine including an outer-rotation-type rotor according to Embodiment 1 as viewed from an axial direction.

An example of a configuration of a rotating electrical machine will be described with reference to FIG. 1. FIG. 1 is a schematic plan view of a rotating electrical machine 1A including an outer-rotation-type rotor 20 as viewed from an axial direction. In FIG. 1, different hatching is applied to each phase coil 13 for better understanding of dispositions of a plurality of phase coils 13 (U-phase coils 13U, V-phase coils 13V, and W-phase coils 13W).

As illustrated in FIG. 1, the rotating electrical machine 1A is an outer-rotation-type rotating electrical machine including a cylindrical stator 10 and a cylindrical rotor 20 that is disposed on a radially outer side of the stator 10 with a gap 19 interposed therebetween and is rotatably supported with respect to the stator 10. The rotor 20 rotates about a rotation axis C.

In the following description, a direction parallel to a rotation axis (rotation center axis) C of the rotor 20 will be referred to as an "axial direction", a direction orthogonal to the rotation axis C of the rotor 20 and centered on the rotation axis C of the rotor 20 will be referred to as a "radial direction", and a direction centered on the rotation axis C of the rotor 20 will be referred to as a "circumferential direction".

The stator 10 and the rotor 20 have the same central axis. The rotor 20 includes a cylindrical rotor core 21 and a plurality of permanent magnets (not illustrated) fixed to the rotor core 21. The rotor core 21 is formed, for example, by laminating a plurality of magnetic steel sheets having an annular shape. The rotor core 21 may be formed by compression-molding a powder magnetic material such as a powder magnetic core. The permanent magnet is disposed in the circumferential direction of the rotor core and forms a magnetic pole in the circumferential direction. The magnetic pole may be formed of a single permanent magnet or may be formed of a plurality of permanent magnets.

The stator 10 includes a cylindrical stator core 11 and a stator coil 12 attached to the stator core 11. The stator coil 12 includes a plurality of phase coils 13 (U-phase coils 13U, V-phase coils 13V, and W-phase coils 13W). The rotating electrical machine 1A operates as an electric motor that rotates the rotor 20 by supplying a three-phase alternating current to the stator coils 12 attached to the stator core 11. The rotating electrical machine 1A may be driven by external energy to operate as a generator and output generated power based on a three-phase alternating current. That is, the rotating electrical machine 1A may have both a function of an electric motor that generates rotational torque on the basis of electric energy and a function of a generator that generates power on the basis of mechanical energy.

The stator core 11 includes an annular back yoke 14, a plurality of teeth 15 protruding radially outward from the back yoke 14, and a plurality of slots SL provided between the teeth 15. The plurality of teeth 15 and the plurality of slots SL are repeatedly formed in the circumferential direction of the stator core 11. The teeth 15 and the slots SL are formed in the axial direction on the outer circumferential portion of the stator core 11. The stator core 11 may be configured by an integrated core in which the plurality of teeth 15 and the back yoke 14 are integrally molded, or may be divided into a plurality of pieces as long as magnetic characteristics do not significantly deteriorate for the purpose of improving a material yield. The stator core 11 is formed, for example, by laminating a plurality of magnetic steel sheets having an annular shape. The stator core 11 may be formed by compression-molding a powder magnetic material such as a powder magnetic core.

The slot SL of the stator core 11 has a semi-closed slot shape including a flange 15a in which the teeth 15 protrude in the circumferential direction in the gap surface.

The plurality of phase coils 13 (U-phase coils 13U, V-phase coils 13V, and W-phase coils 13W) configuring the stator coil 12 are mounted in the slots SL. The phase coil 13 has an in-slot conductor Cs disposed inside the slot SL and a coil end (an out-of-slot conductor) Ce disposed outside the slot SL. Each phase coil 13 is provided with lead-out portions T1 and T2 for input and output connected to an external circuit (not illustrated) including an inverter device and the like.

The U-phase coil 13U, the V-phase coil 13V, and the W-phase coil 13W are disposed to be shifted by 120° in terms of electrical angle in the circumferential direction of the stator 10. In each phase coil 13, phases of input current fundamental wave components are different from each other by 120°. When a three-phase alternating current is supplied to the stator coil 12 to generate a rotating magnetic field in the stator 10, the rotating magnetic field acts on a magnetic pole (not illustrated) of the rotor 20 to generate torque, and thus the rotor 20 rotates.

Although FIG. 1 illustrates the rotating electrical machine 1A having 16 poles and 18 slots as an example, as described above, a pole slot combination may be any combination as long as the rotating electrical machine has a configuration of concentrated winding and fractional slots. Hereinafter, a shape and a disposition of the segment coils configuring the phase coil 13 and a connection structure between the segment coils will be described in detail with reference to the drawings, but a pole slot combination is different from that illustrated in FIG. 1.

Figure 2A:
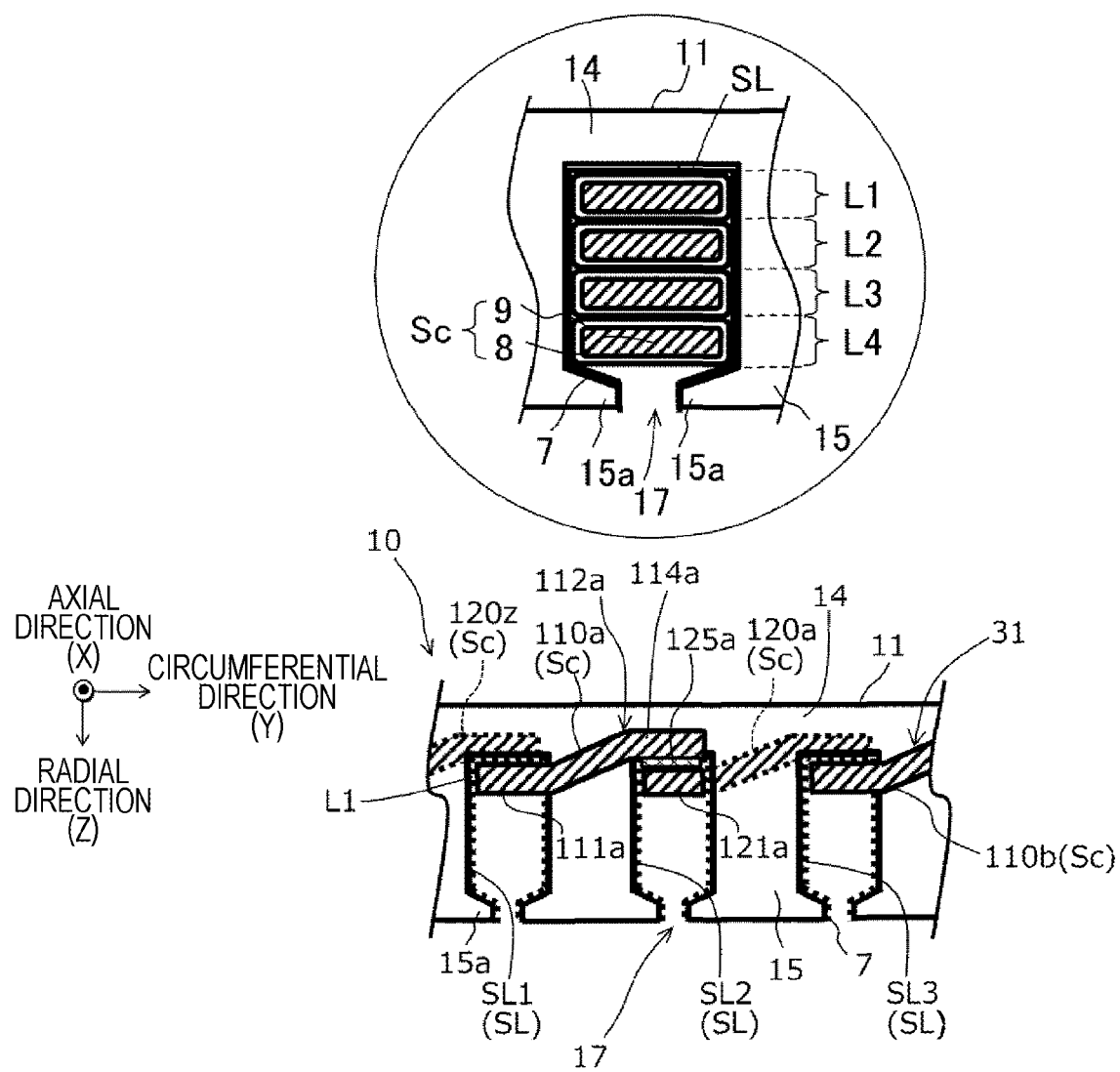
FIG. 2A is a view of a part of a phase coil disposed in a first layer of a stator core of Embodiment 1 as viewed from one side in an axial direction.
Figure 2B:
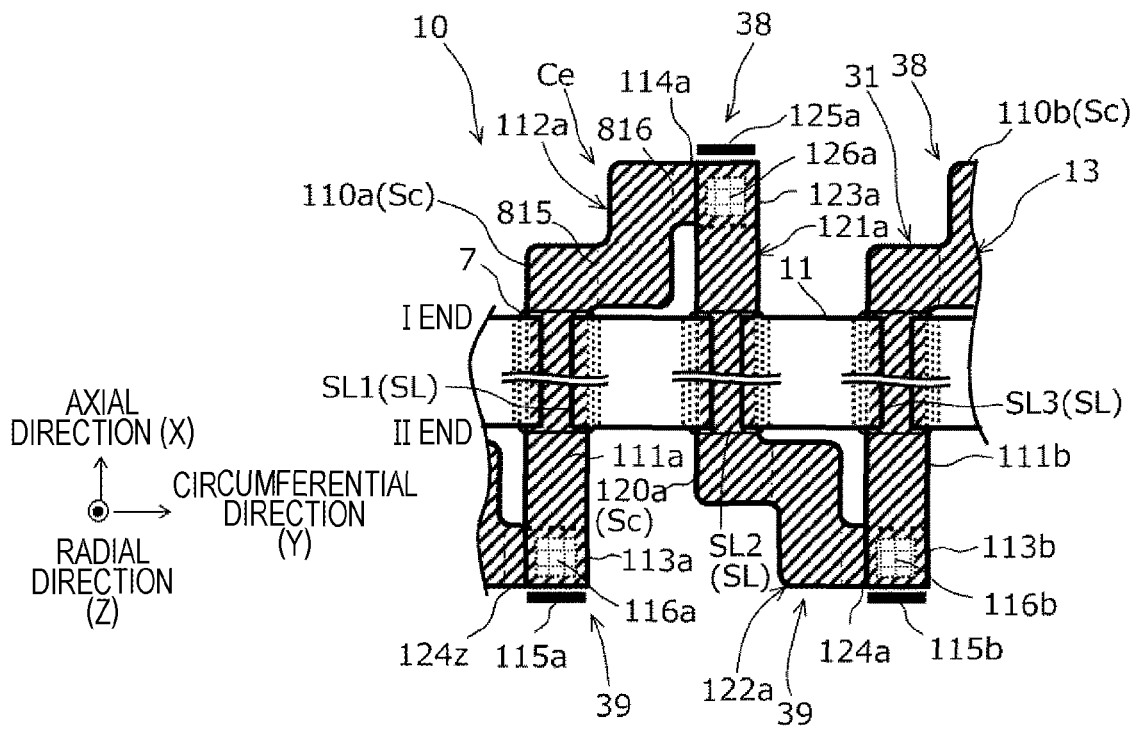
FIG. 2B is a view of a part of the phase coil disposed in the first layer of the stator core of Embodiment 1 as viewed from a radial direction.
Figure 2C:
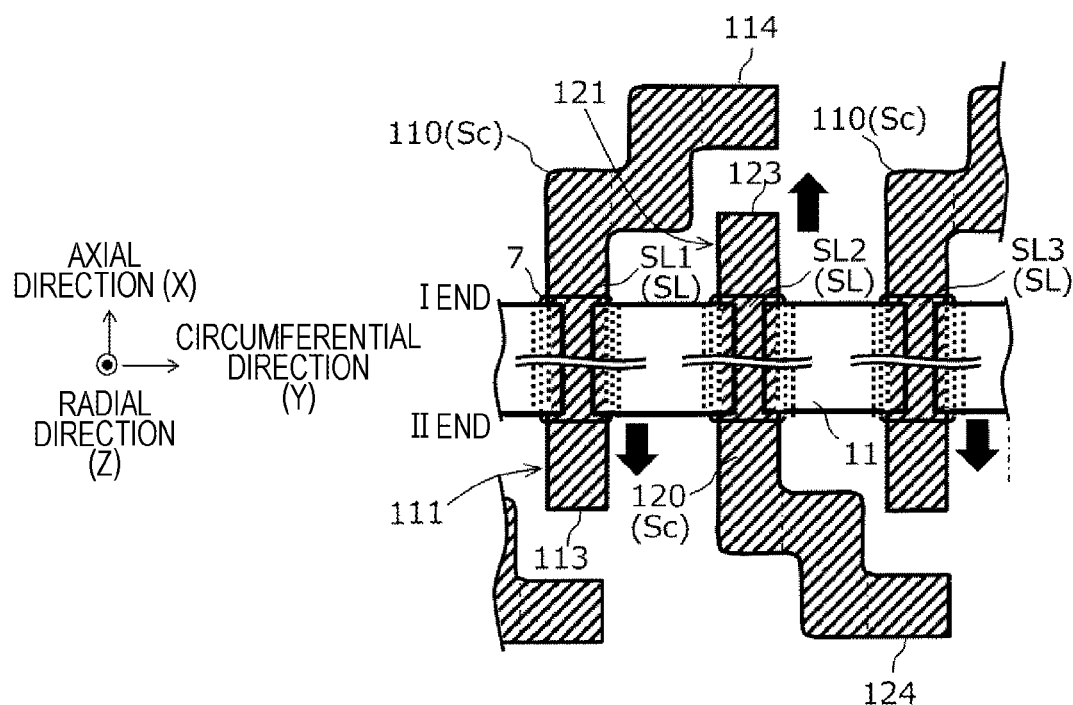
FIG. 2C is a view for describing the assembly of the segment coil disposed in the first layer of the stator core of Embodiment 1.
Figure 3:
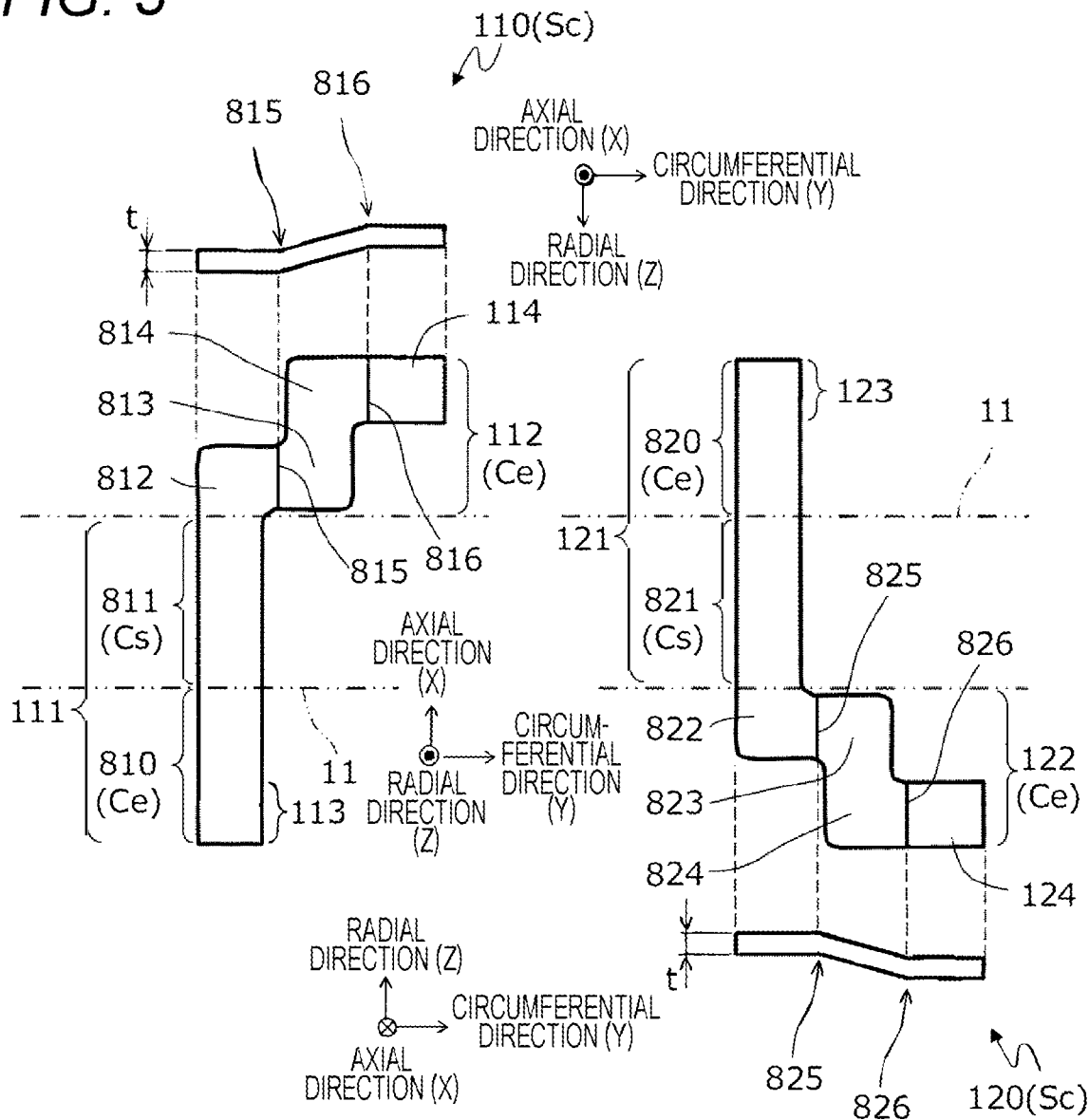
FIG. 3 is a diagram for describing a configuration of a segment coil.

A specific example of the configurations of the stator core 11 and the phase coil 13 will be described with reference to FIGS. 2A to 6B. Although the stator 10 has a cylindrical shape, the stator 10 is schematically illustrated in a linear shape in each drawing. Each configuration will be as appropriate described with the axial direction of the rotating electrical machine 1A as an X-axis direction, the circumferential direction of the rotating electrical machine 1A as a Y-axis direction, and the radial direction of the rotating electrical machine 1A as a Z-axis direction. FIG. 2A is a view of a part of the phase coil 13 disposed in a first layer L1 of the stator core 11 as viewed from one side in the axial direction (the upper side of FIG. 2B). In the lower diagram of FIG. 2A, since a part of the coil 13 is disposed on the back side of the stator core 11, it is indicated by a hidden line (dotted line). FIG. 2A is, for reference, an enlarged sectional view in a case where the phase coil 13 is disposed in each layer (L1 to L4) of the slot SL. FIG. 2B is a view of a part of the phase coil 13 disposed in the first layer L1 of the stator core 11 as viewed from the radial direction. FIG. 2C is a diagram for describing the assembly of segment coils Sc disposed in the first layer L1 of the stator core 11. FIG. 3 is a diagram for describing a configuration of the segment coil Sc. In FIGS. 2A to 2C, one coil winding (one cycle of wave winding) is configured by two segment coils Sc, and wave winding in a plurality of cycles is further arranged in the circumferential direction. Therefore, the same alphabetical lower case code is written at the end of the illustrated code for elements configuring the same cycle such that the wave winding can be identified for each cycle. For example, in a case where two cycles of wave winding are arranged in the circumferential direction, an element configuring the wave winding in the first cycle is denoted by the alphabetical lowercase letter a at the end of the illustrated reference sign, and an element configuring the wave winding in the second cycle is denoted by the alphabetical lowercase latter b at the end of the illustrated reference sign. The same applies to the third and subsequent cycles. The same applies to the reference signs in FIG. 3 and subsequent drawings.

As illustrated in FIG. 2A, the stator core 11 has a plurality of slots SL (SL1, SL2, SL3 . . . ) in the circumferential direction. As illustrated in the partially enlarged view of FIG. 2A, a plurality of segment coils Sc are disposed in a line of layers in the radial direction in the slot SL. In the present embodiment, the inside of the slot SL is divided into four conductor accommodating portions (layers). The conductor accommodating portions (layers) are referred to as a first layer L1, a second layer L2, a third layer L3, and a fourth layer L4 in order from the back yoke 14 side toward the tip side of the tooth 15 (the radial opening 17 side of the slot SL). That is, the plurality of segment coils Sc are disposed in each of the plurality of layers (the first layer L1 to the fourth layer L4) arranged in a line in the radial direction in the slot SL.

In order to ensure insulation between the segment coil Sc and the stator core 11, an insulation material 7 such as insulation paper or an insulation resin bobbin is disposed in the slot SL to surround the plurality of segment coils Sc. Surfaces of metal conductors 8 of the plurality of segment coils Sc are coated with an insulation film 9 such as an epoxy resin in order to ensure insulation between the segment coils Sc adjacent in the radial direction in the slot SL.

The plurality of segment coils Sc configuring the phase coil 13 are formed by connecting a first segment coil 110 disposed in a predetermined layer in a predetermined slot SL to a second segment coil 120 disposed in the predetermined layer in a slot (adjacent slot) SL adjacent to the predetermined slot SL.

A shape of the segment coil Sc will be described in detail with reference to FIG. 3 before describing a method of connecting the segment coils with reference to FIGS. 2A to 2C.

As illustrated in FIG. 3, each of the first segment coil 110 and the second segment coil 120 is an L-shaped single component having a predetermined thickness t. The first segment coil 110 and the second segment coil 120 have a configuration in which the thickness t in the radial direction is smaller than the width in the circumferential direction or the width in the axial direction in a cross section orthogonal to an energization direction. Thus, as will be described later, a punching process of punching a conductor plate to form an L-shaped conductor piece may be adopted in a step of manufacturing the first segment coil 110 and the second segment coil 120. In the punching process, a conductor piece of which the degree of freedom in shape in the XY plane is high and which has a complicated shape can be easily formed, and thus the number of manufacturing steps of the first segment coil 110 and the second segment coil 120 can be reduced.

Since the first segment coil 110 and the second segment coil 120 have mirror-symmetrical shapes and have similar configurations, a configuration of the first segment coil 110 will be described as a representative. The first segment coil 110 includes a first region 111 having a linear portion 811 disposed in the slot SL and a projection 810 protruding from one end side (the lower side in the drawing) of the linear portion 811 to the outside of the slot SL, and a second region 112 formed to extend from the other end side (the upper side in the drawing) of the linear portion 811 toward one side (the right side in the drawing) in the circumferential direction and change in a position in the radial direction outside the slot SL on the other end side of the linear portion 811.

The linear portion 811 corresponds to the in-slot conductor Cs disposed inside the slot SL of the stator core 11, and the projection 810 and the second region 112 correspond to the coil end Ce disposed outside the slot SL of the stator core 11.

The first region 111 is formed linearly to be inserted into the slot SL of the stator core 11 from the axial direction. Hereinafter, the tip of the projection 810, that is, the tip of the first region 111 will be referred to as a first end 113. The second region 112 is formed in a stepped shape (crank shape). Hereinafter, the tip of the second region 112 will be referred to as a second end 114.

The second region 112 includes a base 812 connected to the other end side (the upper side in the drawing) of the linear portion 811, a circumferential extension 813 extending from the base 812 toward one side (the right side in the drawing) in the circumferential direction, an axial extension 814 extending from the circumferential extension 813 toward the axial outside (the upper side in the drawing) of the stator core 11, and a second end 114 connected to the axial extension 814. The second end 114 extends from the axial extension 814 toward one circumferential direction side (the right side in the drawing).

In other words, the second region 112 includes the base 812 that extends from the linear portion 811 with the same plate width and extends by a predetermined length from the first region 111 to the axial outside (the upper side in the drawing), the circumferential extension 813 bent by 90° from the base 812 to one side (the right side in the drawing) in the circumferential direction and extending by a predetermined length in the circumferential direction, the axial extension 814 bent by 90° from the circumferential extension 813 to the axial outside (the upper side in the drawing) and extending by a predetermined length in the axial direction, and the second end 114 bent by 90° from the axial extension 814 to one side (the right side in the drawing) in the circumferential direction and extending by a predetermined length in the circumferential direction. As a result, the second region 112 has a step shape (crank shape).

A difference between the first segment coil 110 and the second segment coil 120 will be described with reference to FIG. 3. The first region 111 is located on the lower side, the second region 112 is located on the upper side, and thus the first segment coil 110 has a stepped shape in which the base 812 has a first step and the axial extension 814 has a second step. On the other hand, the first region 121 is located on the upper side, the second region 122 is located on the lower side, and thus the second segment coil 120 has a stepped shape in which the axial extension 824 has the first step and the base 822 has the second step.

A plurality of bent portions (a first bent portion 815 and second a bent portion 816) for disposing the second end 114 at positions shifted radially inward with respect to the linear portion 811 are formed in the second region 112. That is, the position of the second region 112 in the radial direction continuously changes between the linear portion 811 and the second end 114 by forming the bent portion (815, 816). For example, the position of the second end 114 is shifted in the radial direction (Z-axis direction) by the thickness t of the segment coil Sc (that is, by one layer). The circumferential extension 813 and the axial extension 814 have an inclination angle with respect to the base 812 by forming the first bent portion 815 between the circumferential extension 813 and the base 812. The second end 114 has an inclination angle with respect to the axial extension 814 by forming the second bent portion 816 between the second end 114 and the axial extension 814.

The first segment coil 110 and the second segment coil 120 are disposed such that a positional relationship between the first region 111 and the second region 112 is opposite in the axial direction, and have shapes that are mirror-symmetrical to each other. Similarly to the first segment coil 110, the second segment coil 120 includes a first region 121 having a linear portion 821 disposed in the slot SL and a protrusion 820 protruding from one end side (the upper side in the drawing) of the linear portion 821 to the outside of the slot SL, and a second region 122 formed to extend from the other end side (the lower side in the drawing) of the linear portion 821 toward one side (the right side in the drawing) in the circumferential direction and change in a position in the radial direction outside the slot SL on the other end side of the linear portion 821. Hereinafter, the tip of the protrusion 820, that is, the tip of the first region 121 will be referred to as a first end 123, and the tip of the second region 122 will be referred to as a second end 124.

The second region 122 includes a base 822 connected to the other end side (the lower side in the drawing) of the linear portion 821, a circumferential extension 823 extending from the base 822 toward one side (the right side in the drawing) in the circumferential direction, an axial extension 824 extending from the circumferential extension 823 toward the axial outside (the lower side in the drawing) of the stator core 11, and a second end 124 connected to the axial extension 824. The second end 124 extends from the axial extension 824 toward one circumferential direction side (the right side in the drawing). The second region 122 has a configuration (transition) in which the position in the radial direction continuously changes between the linear portion 821 and the second end 124 by forming the bent portion (825, 826).

With such a configuration, the second end 114 of the first segment coil 110 can be disposed to overlap the first end 123 of the second segment coil 120 in the radial direction. The second region 112 of the first segment coil 110 and the second region 122 of the second segment coil 120 both extend in one circumferential direction. Thus, when the first segment coil 110 and the second segment coil 120 are alternately connected in the first layer L1, a wavy coil is formed as illustrated in FIG. 2B.

Hereinafter, a method of connecting the segment coils will be described in detail with reference to FIGS. 2A to 2C.

As illustrated in FIGS. 2A and 2B, the first segment coil 110a, the second segment coil 120a, and the first segment coil 110b are sequentially disposed in the first layer L1 of each of the first slot SL1, the second slot SL2, and the third slot SL3. On one axial end side (I end side) of the stator core 11, the second end 114a of the first segment coil 110a is disposed adjacent to the first end 123a of the second segment coil 120a in the radial direction and connected to each other. On the other axial end side (II end side) of the stator core 11, the second end 124a of the second segment coil 120a is disposed to be adjacent to the first end 113b of the first segment coil 110b in the radial direction and connected to each other.

As illustrated in FIG. 2B, in the first layer L1, the first segment coils 110a, 110b, . . . , and the second segment coils 120a, 120b, . . . , are alternately connected in the circumferential direction, and thus a wavy coil 31 is formed in the first layer L1. The wavy coil 31 has a wavy shape in which a crest portion 38 protruding in one axial direction and a valley portion 39 protruding in the other axial direction are alternately disposed at both ends of the coil end in the circumferential direction.

As described above, by alternately connecting the first segment coil 110 and the second segment coil 120 in the circumferential direction, it is possible to realize a configuration in which two or more sets of in-phase coils are continuous in the circumferential direction in the rotating electrical machine 1A having concentrated winding and fractional slots.

As illustrated in FIGS. 2A and 2B, the second end 114a of the first segment coil 110a is displaced by one layer in the radial direction with respect to the first region 111a outside the slot SL, overlaps the first end 123a of the second segment coil 120a in the radial direction, and is electrically and mechanically connected via a conductive portion (hereinafter, referred to as a linear conductive portion) 125a extending linearly in the circumferential direction.

The linear conductive portion 125a corresponds to a welding line formed through electron beam welding, laser welding, or the like. Since the linear conductive portion 125a is located at the axial end of the coil end Ce, visual inspection by an operator and appearance inspection by an automatic inspection machine are facilitated. Since the linear conductive portion 125a can be physically accessed from the outside of the stator 10, it is easy for an operator to repair a connection portion, perform inspection with contact, and the like.

As the conductive portion, conductive portion (hereinafter, referred to as a planar conductive portion) 126a having a planar shape may be provided instead of the linear conductive portion 125a. The planar conductive portion 126a is located at the axial end of the coil end Ce of the first segment coil 110a and the second segment coil 120a, and electrically and mechanically connects facing surfaces of the second end 114a of the first segment coil 110a and the first end 123a of the second segment coil 120a.

Since the planar conductive portion 126a is located at the axial end of the coil end Ce, visual inspection by an operator and appearance inspection by an automatic inspection machine are facilitated. Since the planar conductive portion 126a can be physically accessed from the outside of the stator 10, it is easy for an operator to repair a connection portion, perform inspection with contact, and the like.

The second end 114a of the first segment coil 110a and the first end 123a of the second segment coil 120a may be connected via both the linear conductive portion 125a and the planar conductive portion 126a. As a result, the reliability of the connection portion between the first segment coil 110a and the second segment coil 120a can be improved. In a configuration in which the second end 114a of the first segment coil 110a and the first end 123a of the second segment coil 120a are connected via one of the linear conductive portion 125a and the planar conductive portion 126a, the manufacturing cost of the rotating electrical machine 1A can be reduced.

The conductive portions (the linear conductive portion 125a and the planar conductive portion 126a) may include at least any one of a conductive paste, a conductive sheet, a conductive adhesive, a solder, a silver brazing material, and metal plating. Since a part or the whole of the conductive portions (the linear conductive portion 125a and the planar conductive portion 126a) is formed by these conductive members, conductivity between the first segment coil 110a and the second segment coil 120a can be improved.

For example, in a case where a metal plating process has been performed on at least one of the second end 114a of the first segment coil 110a and the first end 123a of the second segment coil 120a, the conductivity between the first segment coil 110a and the second segment coil 120a is improved by a metal plating material. The planar conductive portion 126a may be formed by using a metal plating material having a relatively low melting point such as zinc or tin. In this case, in a state in which the metal plating material is disposed between the second end 114a of the first segment coil 110a and the first end 123a of the second segment coil 120a, heating treatment is performed until the metal plating material is melted. As a result, the metal plating material solidified due to cooling is formed as the planar conductive portion 126a, and the second end 114a and the first end 123a are electrically and mechanically connected via the metal plating material (planar conductive portion 126a).

Since a configuration of a connection portion between the second end 124a of the second segment coil 120a and the first end 113b of the first segment coil 110b is also the same, the description thereof is herein omitted.

As illustrated in FIG. 2C, the first region 111 of the first segment coil 110 is inserted into the first layer L1 of the first slot SL1 from one side (the upper side in the drawing) in the axial direction, and the first end 113 and the second end 114 are disposed outside the slot SL. The first region 121 of the second segment coil 120 is inserted into the first layer L1 of the second slot SL2 from the other side in the axial direction (the lower side in the drawing), and the first end 123 and the second end 124 are disposed outside the slot SL.

Figure 4A:
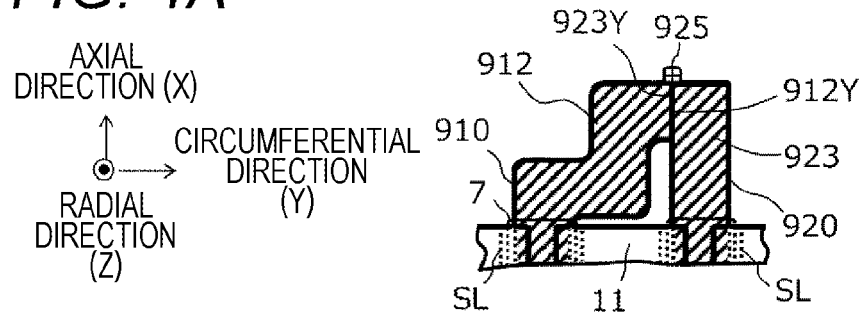
FIG. 4A is a partial side view of a coil end of a stator according to a comparative example of Embodiment 1.
Figure 4B:
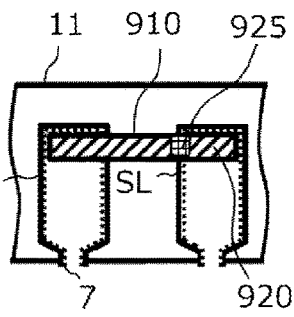
FIG. 4B is a partial plan view of a stator according to the comparative example of Embodiment 1.

Here, an example in which the bent portions 815 and 816 are not provided will be described as a comparative example of the present Embodiment 1 with reference to FIGS. 4A and 4B. FIG. 4A is a partial side view of a coil end of a stator according to a comparative example of Embodiment 1, and FIG. 4B is a partial plan view of the stator according to the comparative example of Embodiment 1. As illustrated in FIGS. 4A and 4B, in this comparative example, a tip surface 912Y of a second region 912 of a first segment coil 910 and a side surface 923Y of the tip of a first end 923 of a second segment coil 920 are disposed to face each other in the circumferential direction (Y direction). In the comparative example, since a conductive portion 925 formed through welding or the like is dotted, the contact resistance increases compared with the present embodiment, and there is a possibility that local heat is generated in the conductive portion 925.

In contrast, in the present embodiment, as illustrated in FIG. 2B, the position of the second region 112a in the radial direction changes (transitions) between the first region 111a and the second end 114a by forming the bent portions 815 and 816. Consequently, the segment coils 110a and 120a adjacent to each other in the circumferential direction can be connected via one or both of the linear conductive portion 125a and the planar conductive portion 126a described above. Therefore, according to the present embodiment, the contact resistance can be reduced compared with the comparative example, and local heat can be prevented from being generated in the conductive portions 125a and 126a. As a result, the rotating electrical machine 1A according to the present embodiment can improve the product reliability compared with the rotating electrical machine according to the comparative example.

Figure 5A:
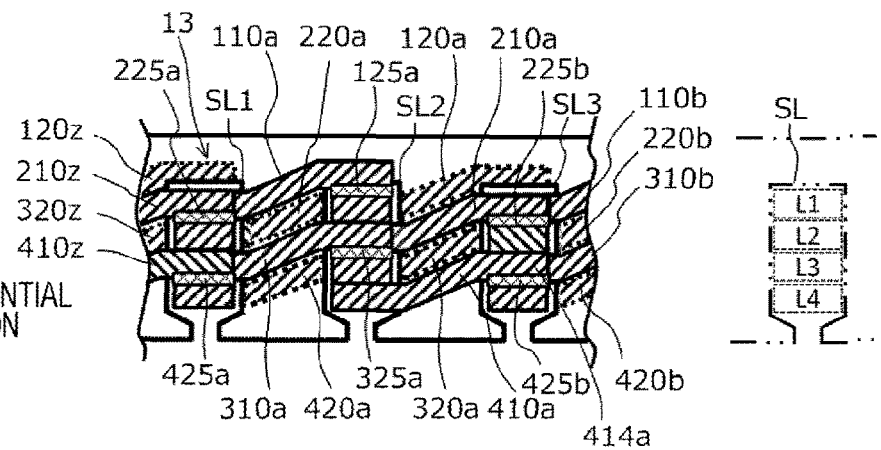
FIG. 5A is a partial plan view of the stator of Embodiment 1 as viewed from the axial direction.
Figure 5B:
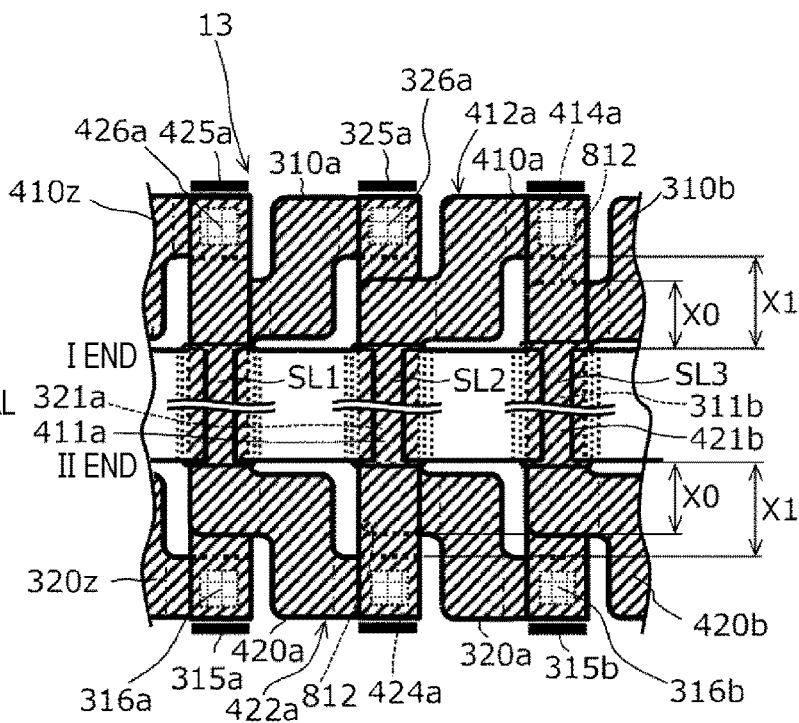
FIG. 5B is a partial side view of the stator of Embodiment 1 as viewed from a gap side.

Next, the segment coil Sc disposed in each layer (L1 to L4) of the slot SL will be described with reference to FIGS. 5A to 5C. FIG. 5A is a partial plan view of the stator 10 as viewed from the axial direction. FIG. 5B is a partial side view of the stator 10 as viewed from the gap 19 side. FIG.

5C is a view in which the segment coil Sc disposed in the fourth layer L4 is omitted in the partial side view of FIG. 5B. A difference from FIGS. 2A and 2B is that, in addition to the first layer coils 110a, 120a, . . . , the second layer coils 210a, 220a, . . . , the third layer coils 310a, 320a, . . . , and the fourth layer coils 410a, 420a, . . . are disposed in the slots SL1, SL2 . . . . As described above, the present invention has a feature that each coil can be disposed without interference even in a state in which all coils are assembled, and thus a detailed structure thereof will be described below.

Figure 5C:
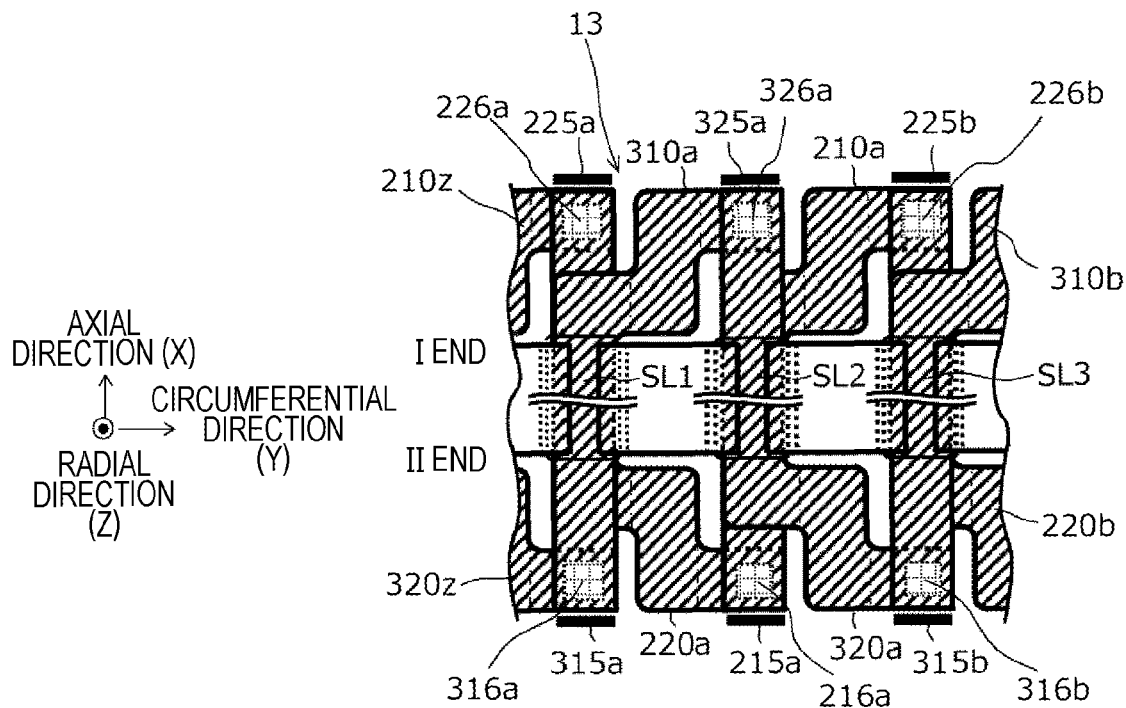
FIG. 5C is a partial side view of the stator of Embodiment 1 as viewed from the gap side, in which a segment coil disposed in a fourth layer is omitted.

As illustrated in FIGS. 5A to 5C, in the rotating electrical machine 1A according to the present embodiment, not only the first segment coil 110 and the second segment coil 120 are alternately disposed in the first layer L1 of each slot SL arranged in the circumferential direction, but also the first segment coils 210, 310, and 410 and the second segment coils 220, 320, and 420 are similarly disposed in the second layer L2 to the fourth layer L4 of each slot SL arranged in the circumferential direction.

In each slot SL, the first segment coils and the second segment coils are alternately disposed in the radial direction. For example, in the first slot SL1, the first segment coil 110a is disposed in the first layer L1, the second segment coil 220a is disposed in the second layer L2, the first segment coil 310a is disposed in the third layer L3, and the second segment coil 420a is disposed in the fourth layer L4. In the second slot SL2 adjacent to the first slot SL1, the second segment coil 120a is disposed in the first layer L1, the first segment coil 210a is disposed in the second layer L2, the second segment coil 320a is disposed in the third layer L3, and the first segment coil 410a is disposed in the fourth layer L4.

A method of connecting the adjacent slots SL is similar to that in FIGS. 2A and 2B for the first layer L1 and the third layer L3. In the first layer L1, the first segment coil 110a of the first slot SL1 and the second segment coil 120a of the second slot SL2 are connected. In the third layer L3, the first segment coil 310a of the first slot SL1 and the second segment coil 320a of the second slot SL2 are connected. On the other hand, regarding the second layer L2 and the fourth layer L4, a basic connection configuration is similar to that in FIGS. 2A and 2B, but dispositions in the circumferential direction of the first segment coil and the second segment coil are exchanged. That is, in the second layer L2, the second segment coil 220a is disposed in the first slot SL1, the first segment coil 210a is disposed in the second slot SL2, and both are connected to each other. In the fourth layer L4, the second segment coil 420a is disposed in the first slot SL1, the first segment coil 410a is disposed in the second slot SL2, and both are connected to each other.

With the above configuration, in the rotating electrical machine 1A according to the present embodiment, when the phase coil 13 is assembled by using the plurality of segment coils Sc, the segment coils Sc do not spatially interfere with each other at the coil end Ce. As described with reference to FIG. 2, the coil end of the segment coil Sc is displaced in the radial direction by one layer with respect to the linear portion disposed in the slot. Therefore, for example, as illustrated in FIGS. 5A and 5B, the second end 414a of the first segment coil 410a disposed in the fourth layer L4 of the second slot SL2 is disposed on an axis of the third layer L3 of the third slot SL3. The axis of the layer refers to a virtual straight line parallel to the axial direction passing through the layer.

As illustrated in FIG. 5B, for example, the second region 412a of the first segment coil 410a is formed in a step shape (crank shape). Therefore, when the first segment coil 410a is assembled to the stator core 11, the second end 414a is disposed away from one axial end surface (I end surface) of the stator core 11 by a predetermined distance X1. The predetermined distance X1 is longer than a distance (that is, a protruding height of the base 812 from the slot SL3) X0 from one axial end surface (I end surface) of the stator core 11 to one axial end surface (upper end surface in the drawing) of the base 812.

Therefore, the second end 414a of the first segment coil 410a disposed in the fourth layer L4 of the second slot SL2 is disposed away from the axial outside of the base 812 of the second region of the first segment coil 310b disposed in the third layer L3 of the third slot SL3. That is, the first region 311b and the base 812 of the first segment coil 310b and the second end 414a of the first segment coil 410a coexist on the axis of the third layer L3 of the third slot SL3.

The above configuration is also similar on the other axial end side (II end side) of the stator core 11. For example, as illustrated in FIG. 5B, the second end 424a of the second segment coil 420a disposed in the fourth layer L4 of the first slot SL1 is disposed away from the axial outside of the base 812 of the second region of the second segment coil 320a disposed in the third layer L3 of the second slot SL2. That is, the first region 321a of the second segment coil 320a and the base 812, and the second end 424a of the second segment coil 420a coexist on the axis of the third layer L3 of the second slot SL2.

As described above, in the present embodiment, the second end 414a of the first segment coil 410a disposed in a predetermined layer (for example, the fourth layer L4) of a predetermined slot (for example, the second slot SL2) is formed to extend toward one side in the circumferential direction and change in a position in the axial direction stepwise so as not to interfere with the second region of the first segment coil 310b disposed in an adjacent layer (for example, the third layer L3) of an adjacent slot (for example, the third slot SL3). Consequently, at the coil end on the I end side, the segment coils Sc can be assembled to the stator core 11 without interference between the first segment coils. In the same manner for the coil end on the II end side, the segment coils Sc can be assembled without interference between the second segment coils.

The plurality of first segment coils have the same shape. The plurality of second segment coils have the same shape. As described above, in the present embodiment, at least two of the plurality of segment coils Sc disposed in the predetermined slot SL have the same shape. As a result, the number of manufacturing steps can be reduced compared with a case where each of the plurality of first segment coils has a different shape or each of the plurality of second segment coils has a different shape. The first segment coil and the second segment coil have mirror-symmetrical shapes, and have the same shape before the bent portions 815, 816, 825, and 826 (see FIG. 3) are formed. As a result, it is possible to reduce the number of molds and the number of processing steps used for punching the conductor plate included in the manufacturing steps of the segment coil Sc.

As illustrated in FIG. 5C, even in a case where the third layer L3 is focused on, at the coil end on the I end side, the segment coils Sc can be assembled to the stator core 11 without interference between the first segment coils having the same shape. In the same manner for the coil end on the II end side, the segment coils Sc can be assembled to the stator core 11 without interference between the second segment coils having the same shape.

Figure 6A:
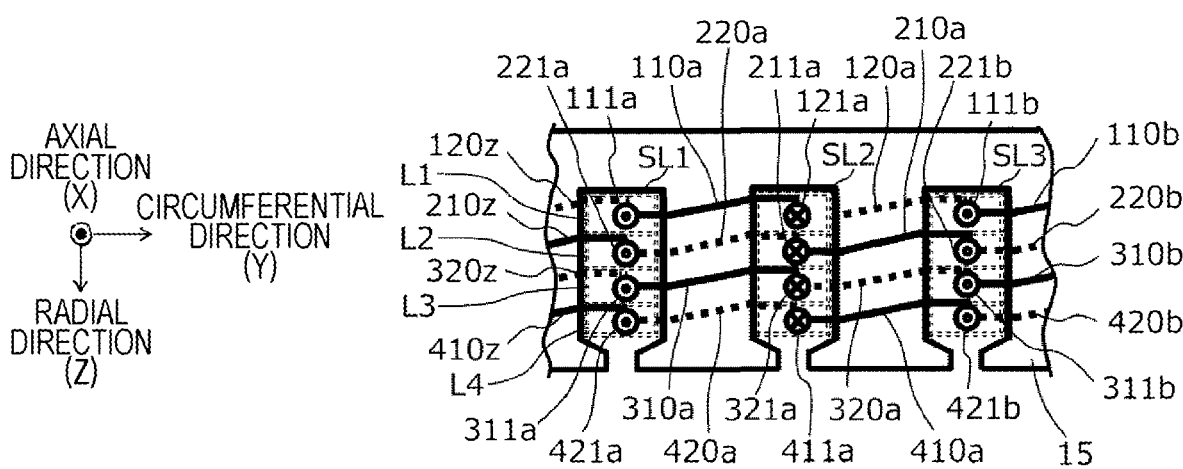
FIG. 6A is a circuit diagram corresponding to a configuration of a phase coil in FIG. 5A, and is a circuit diagram of the stator as viewed from the axial direction.
Figure 6B:
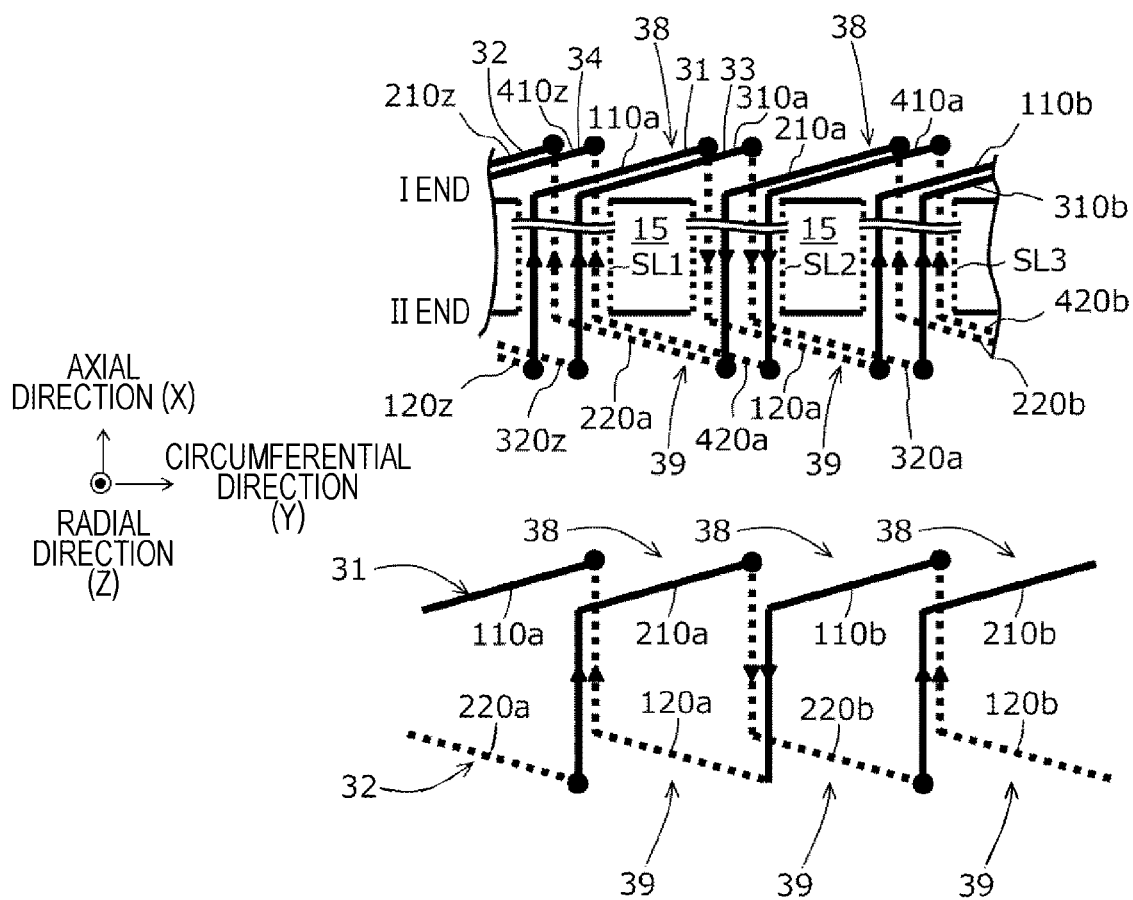
FIG. 6B is a circuit diagram corresponding to a configuration of a phase coil in FIG. 5B, and is a circuit diagram of the stator as viewed from the gap side.

FIGS. 6A and 6B are circuit diagrams corresponding to the configuration of the phase coil 13 in FIGS. 5A and 5B, in which FIG. 6A is a circuit diagram of the stator 10 as viewed from the axial direction, and FIG. 6B is a circuit diagram of the stator as viewed from the gap 19 side. A filled circle "●" in FIG. 6B schematically represents a connection portion between the first segment coil and the second segment coil, and an arrow represents a direction of a current. In FIGS. 6A and 6B, the first segment coil is indicated by a solid line, and the second segment coil is indicated by a dashed line. FIG. 6B also illustrates a schematic diagram for describing a disposition configuration of the wavy coils 31 and 32 in the first layer L1 and the second layer L2.

As illustrated in FIG. 6B, in the first layer L1 of the plurality of slots SL arranged in the circumferential direction, the first segment coils 110 and the second segment coils 120 are alternately connected in the circumferential direction, and thus the wavy coils 31 in which the crest portions 38 and the valley portions 39 are alternately disposed in the circumferential direction are formed. Similarly, the wavy coils 32, 33, and 34 in which the crest portions 38 and the valley portions 39 are alternately disposed at both ends of the coil end in the circumferential direction are formed in the second layer L2 to the fourth layer L4. That is, the wavy coils 31 to 34 are respectively formed in the plurality of layers (L1 to L4). Here, the circumferential positions of the crest portion 38 and the valley portion 39 of the wavy coil 31 disposed in the first layer L1 and the circumferential positions of the crest portion 38 and the valley portion 39 of the wavy coil 32 disposed in the second layer L2 are shifted by one slot pitch. The circumferential positions of the crest portion 38 and the valley portion 39 of the wavy coil 33 disposed in the third layer L3 and the circumferential positions of the crest portion 38 and the valley portion 39 of the wavy coil 34 disposed in the fourth layer L4 are shifted by one slot pitch. The circumferential positions of the crest portion 38 and the valley portion 39 of the wavy coil 31 of the first layer L1 and the wavy coil 33 of the third layer L3 coincide with each other, and the circumferential positions of the crest portion 38 and the valley portion 39 of the wavy coil 32 of the second layer L2 and the wavy coil 34 of the fourth layer L4 coincide with each other. That is, in the stator 10 according to the present embodiment, the crest portions 38 and the valley portions 39 of the plurality of wavy coils 31, 32, 33, and 34 are alternately disposed in the radial direction, and thus a coil disposition of concentrated winding and fractional slots is realized by wave winding.

As a result, currents in the same direction concentrate on and flow through the plurality of segment coils Sc disposed around one tooth 15. For example, as illustrated in FIG. 6B, a clockwise current flows around the teeth 15 between the first slot SL1 and the second slot SL2, and a counterclockwise current flows around the teeth 15 between the second slot SL2 and the third slot SL3. That is, as illustrated in FIGS. 6A and 6B, currents in the same direction (a direction from the II end side to the I end side) flow through the four linear portions disposed in the first slot SL1. Currents in the same direction (a direction from the I end side to the II end side) flow through the four linear portions disposed in the second slot SL2. As described above, in the rotating electrical machine 1A according to the present embodiment, a current distribution of concentrated winding and fractional slots is formed.

As illustrated in FIG. 6B, for example, the connection portions between the second segment coils 120a and 320a disposed in the odd layers (L1, L3) of the second slot SL2 and the first segment coils 110a and 310a disposed in the odd layers (L1, L3) of the first slot SL1 are disposed on the I end side of the second slot SL2. In contrast, the connection portions of the first segment coils 210a and 410a disposed in the even layers (L2, L4) of the second slot SL2 is not disposed on the I end side of the second slot SL2, are bent from the second slot SL2 toward the third slot SL3 side, and are connected to the second segment coils 220b and 420b disposed in the even layers (L2, L4) of the third slot SL3 on the I end side of the third slot SL3. As a result, interference between the segment coils Sc on the I end side of the second slot SL2 is avoided. Similarly, interference between the segment coils Sc on the I end side of the other slots SL is avoided.

For example, the connection portions between the first segment coils 210a and 410a disposed in the even layers (L2, L4) of the second slot SL2 and the second segment coils 220a and 420a disposed in the even layers (L2, L4) of the first slot SL1 are disposed on the II end side of the second slot SL2. In contrast, the connection portions of the second segment coils 120a and 320a disposed in the odd layers (L1, L3) of the second slot SL2 are not disposed on the II end side of the second slot SL2, are bent from the second slot SL2 toward the third slot SL3 side, and are connected to the first segment coils 110b and 310b disposed in the odd layers (L1, L3) of the third slot SL3 on the II end side of the third slot SL3. As a result, interference between the segment coils Sc on the II end side of the second slot SL2 is avoided. Similarly, the interference between the segment coils Sc on the II end side of the other slots SL is avoided.

Figure 7:
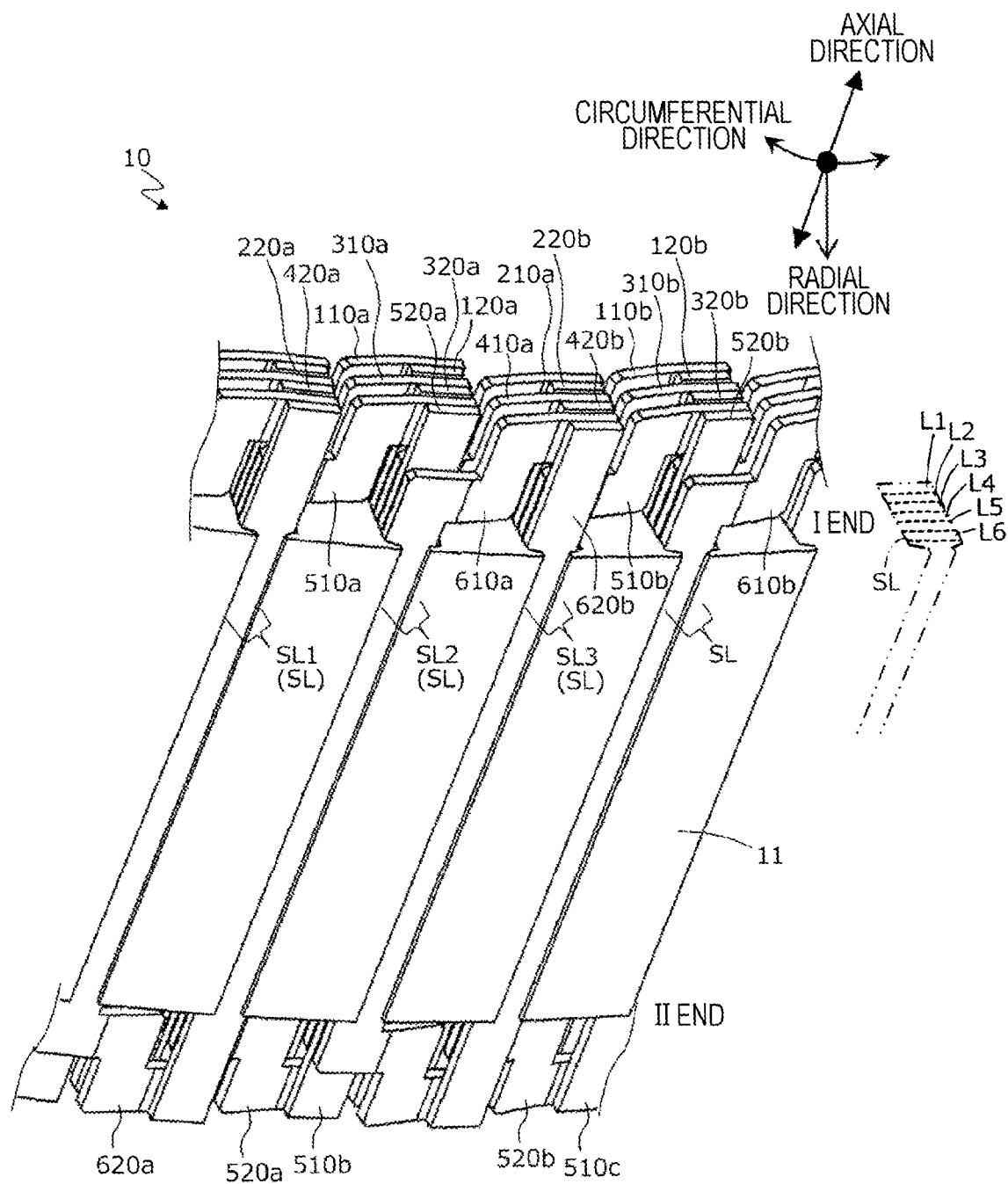
FIG. 7 is a partial perspective view of a stator having a slot including six layers.

Next, a stator 10 of another form will be described with reference to FIG. 7. FIG. 7 is a partial perspective view of the stator 10 having the slot SL configured with six layers. The slot SL of the stator 10 includes a first layer L1 to a sixth layer L6. As illustrated in FIG. 7, for example, connection portions between the second segment coils 120a, 320a, and 520a disposed in the odd layers (L1, L3, L5) of the second slot SL2 and the first segment coils 110a, 310a, and 510a disposed in the odd layers (L1, L3, L5) of the first slot SL1 are disposed on the I end side of the second slot SL2. In contrast, the connection portions of the first segment coils 210a, 410a, and 610a disposed in the even layers (L2, L4, L6) of the second slot SL2 are not disposed, and are bent from the second slot SL2 toward the third slot SL3 side, and are connected to the second segment coils 220b, 420b, and 620b disposed in the even layers (L2, L4, L6) of the third slot SL3 on the I end side of the third slot SL3. As a result, interference between the segment coils Sc on the I end side of the second slot SL2 is avoided. Similarly, interference between the segment coils Sc on the I end side of the other slots SL is avoided. Similarly, interference between the segment coils Sc on the II end side of each slot SL is avoided.

According to the above-described embodiment, the following operational effects are achieved. Examples of a predetermined slot, a slot adjacent to the predetermined slot, a predetermined layer, and a layer adjacent to the predetermined layer are written in parentheses.

(1) The rotating electrical machine 1A includes the stator 10 having the stator core 11 having the plurality of slots SL and the plurality of segment coils Sc disposed in the plurality of slots SL of the stator core 11. The plurality of segment coils Sc are respectively disposed in a plurality of layers arranged in a line in the radial direction in the slot SL. The plurality of segment coils Sc include the first segment coil 110 disposed in a predetermined slot (first slot SL1) and the second segment coil 120 disposed in an adjacent slot (second slot SL2) adjacent to the predetermined slot (first slot SL1). The first segment coil 110 and the second segment coil 120 respectively include the linear portions 811 and 821 having a linear shape and disposed in the slot SL, the first ends 113 and 123 protruding from one end sides of the linear portions to the outside of the slot SL, and the second regions 112 and 122 formed to extend from the other end sides of the linear portions toward one side in the circumferential direction and change in a position in the radial direction outside the slot SL on the other end sides of the linear portions. As illustrated in FIGS. 2A and 2B, the second end 114, which is the tip of the second region 112 of the first segment coil 110 disposed in the predetermined slot (first slot SL1), is disposed to be adjacent to the first end 123 of the second segment coil 120 disposed in the same layer (first layer L1) as the first segment coil 110 in the adjacent slot (second slot SL2) in the radial direction, and is connected to the first end 123 of the second segment coil 120.

According to such a configuration, even in a state which the segment coils Sc are assembled to the stator core 11, the segment coils Sc do not interfere with each other at the coil end Ce, and a coil disposition of concentrated winding and fractional slots can be realized by wave winding. Thus, the linear portions of the segment coils Sc are disposed in a line of layers in the slot SL, and thus a space factor of the segment coils Sc in the slot SL can be increased. Therefore, according to the present embodiment, the efficiency and output of the rotating electrical machine 1A can be improved without increasing a size of the rotating electrical machine 1A.

(2) According to the above configuration, the first segment coil 110 can be inserted into the slot SL from one end side in the axial direction, and the second segment coil 120 can be inserted into the slot SL from the other end side in the axial direction. Thus, in the rotating electrical machine 1A according to the present embodiment, the stator core 11 having a semi-closed slot structure may be adopted. Therefore, the rotating electrical machine 1A according to the present embodiment can reduce a torque pulsation compared with a rotating electrical machine having a stator core having an open closed slot structure.

(3) In the above configuration, since the first segment coil 110 and the second segment coil 120 are connected outside the slot SL, it is possible to visually inspect the connection portion between the segment coils Sc and to physically access the connection portion.

(4) In the above configuration, the coil disposition of concentrated winding and fractional slot can be realized by wave winding by using the first segment coil 110 and the second segment coil 120. Consequently, it is possible to eliminate the need for a crossover wire for connecting the concentrated winding coils spirally wound around each of the teeth 15 and thus to achieve downsizing of the rotating electrical machine 1A.

(5) The thickness of each of the first segment coil 110 and the second segment coil 120 in the radial direction is smaller than the width thereof in the circumferential direction or the axial direction in the cross section orthogonal to the energization direction. Thus, materials of the first segment coil 110 and the second segment coil 120 can be efficiently manufactured through a punching process from a conductor plate such as a copper plate. Therefore, according to the present embodiment, it is possible to reduce the number of manufacturing steps and the manufacturing cost.

(6) The first segment coil 110 and the second segment coil 120 are each an L-shaped single component. Therefore, it is possible to reduce the number of manufacturing steps and the manufacturing cost compared with a case of forming the segment coil Sc by bundling and molding a plurality of bare wires.

(7) As illustrated in FIG. 5B, in the rotating electrical machine 1A, a first segment coil (410a) is disposed in a predetermined layer (fourth layer L4) of a predetermined slot (second slot SL2) of the stator core 11, a second segment coil (320a) is disposed in an adjacent layer (third layer L3) adjacent to the predetermined layer (fourth layer L4) of the predetermined slot (second slot SL2), a second segment coil (420b) is disposed in the predetermined layer (fourth layer L4) of an adjacent slot (third slot SL3) adjacent to the predetermined slot (second slot SL2), and a first segment coil (310b) is disposed in an adjacent layer (third layer L3) of the adjacent slot (third slot SL3). A second region (412a) of the first segment coil (410a) disposed in the predetermined layer (fourth layer L4) of the predetermined slot (second slot SL2) is formed to extend toward one side in the circumferential direction and change in a position in the axial direction such that a second end (414a) of the first segment coil (410a) does not interfere with the second region of the first segment coil (310b) disposed in the adjacent layer (third layer L3) of the adjacent slot (third slot SL3). Thus, the segment coils Sc can be assembled to the stator core 11 without interference between the first segment coils.

As described above, according to the present embodiment, significant performance improvement can be achieved in the rotating electrical machine 1A having the concentrated winding and fractional slot structure. According to the present embodiment, it is possible to simultaneously achieve improvement in space factor, reduction in AC copper loss, reduction in cogging torque, elimination of crossover wires at the coil end, reduction in processing and molding cost of the stator coil 12, and improvement in electrical and mechanical reliability of a coil connection portion.

A positioning step before welding can be easily completed by simply inserting the segment coil Sc molded in advance through a punching process on a conductor plate or the like into the slot SL of the stator core 11. Therefore, it is possible to prevent the insulation material 7 such as insulation paper and the insulation film 9 of the segment coil Sc from being damaged, and thus to prevent the occurrence of an insulation failure. Since it is not necessary to perform bending or the like on the segment coil Sc after inserting the segment coil Sc into the slot SL, it is also possible to solve the problem that welding defects occur due to variations in bending angles caused by spring back or the like.

Since the segment coils Sc are connected through electron beam welding or laser welding, a linear portion extending in the axial direction required for tungsten-inert gas welding (TIG welding) is unnecessary. Therefore, according to the present embodiment, sizes and weights of the stator 10 and the rotating electrical machine 1A can be reduced. According to the present embodiment, a caulking fitting for preventing positional deviation at the connection portion is also unnecessary. Therefore, since the number of components and the number of work steps can be reduced, the manufacturing cost of the rotating electrical machine 1A can be reduced.

Figure 8:
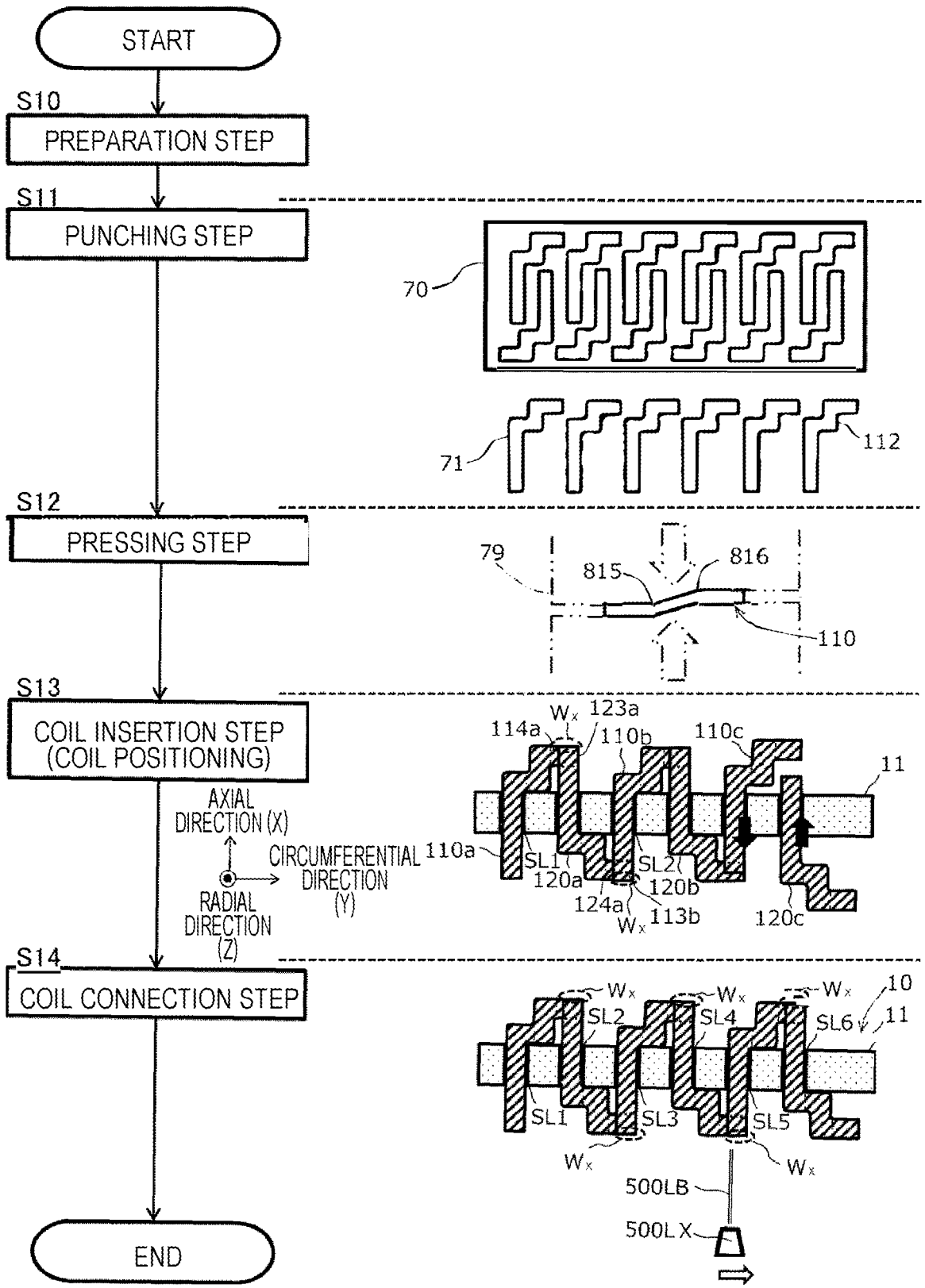
FIG. 8 is a diagram for describing a step of manufacturing a stator of a rotating electrical machine.

Next, an example of a method of manufacturing the stator 10 will be described with reference to FIG. 8. FIG. 8 is a diagram for describing a step of manufacturing the stator 10 of the rotating electrical machine 1A. The method of manufacturing the stator 10 includes a preparation step S10, a punching step S11, a pressing step S12, a coil insertion step S13, and a coil connection step S14. In the preparation step S10, a plate-like conductor plate 70 made of a conductive material such as copper or aluminum and having a predetermined thickness is prepared as a material of the segment coil Sc. In the preparation step S10, a mold for punching the conductor plate 70 is prepared. It is preferable to employ a mold capable of forming a plurality of L-shaped conductor pieces 71 through one punching process. When the preparation step S10 is completed, the process proceeds to a punching step S11.

In the punching step S11, the conductor plate 70 is punched by using the mold to produce a plurality of L-shaped conductor pieces 71. The punching process is characterized by a high degree of freedom in two-dimensional processing of the conductor plate 70. In the present embodiment, the step-shaped second region 112 can be easily formed in the punching step S11. The thickness of the conductor plate 70 is a thickness of the segment coil Sc, that is, a radial dimension of the segment coil Sc assembled to the stator core 11. When the punching step S11 is completed, the process proceeds to the pressing step S12.

In the pressing step S12, the conductor piece 71 formed in the punching step S11 is pressed by a mold 79. As a result, the bent portions 815 and 816 are formed in the conductor piece 71, and thus the first segment coil 110 is manufactured. Although not illustrated, in the pressing step S12, the conductor piece 71 formed in the punching step S11 is pressed, and thus the second segment coil 120 having the bent portions 825 and 826 is also manufactured. When the pressing step S12 is completed, the process proceeds to the coil insertion step S13.

Although not illustrated, an insulation film forming process is performed prior to the coil inserting step S13. In the insulation film forming process, an insulation film 9 is formed on each segment coil Sc in advance.

In the coil insertion step S13, the plurality of segment coils Sc are inserted into the slots SL of the stator core 11 and positioned. The first segment coil 110 is inserted into the slot SL from one axial end side (the upper side in the drawing) of the stator core 11, and the second segment coil 120 is inserted into the slot SL from the other axial end side (the lower side in the drawing) of the stator core 11. The second end 114a of the first segment coil 110a and the first end 123a of the second segment coil 120a are disposed to overlap each other in the radial direction. The axial end surface of the second end 114a and the axial end surface of the first end 123a are disposed to be flush with each other, and this portion becomes a connection location Wx formed through welding. Similarly, the second end 124a of the second segment coil 120a and the first end 113b of the first segment coil 110b are disposed to overlap each other in the radial direction. The axial end surface of the second end 124a and the axial end surface of the first end 113b are disposed to be flush with each other, and this portion becomes a connection location Wx formed through welding. The same insertion work is repeated in the circumferential direction (in the drawing, up to the work of inserting the second segment coil 120c), and when the coil insertion step S13 is completed, the process proceeds to the coil connection step S14.

In the coil connecting step S14, the segment coils Sc are connected to each other at the connection location Wx through, for example, laser welding. The insulation film 9 at the connection location Wx of the segment coil Sc is removed in advance. In step S14, laser light 500LB is emitted from an emission unit 500LX of a laser welding machine in the axial direction toward the connection location Wx, and the emission unit 500LX is moved in the circumferential direction to form the linear conductive portions 115 and 125 (see FIG. 2B). If necessary, the planar conductive portion 126 (see FIG. 2B) connecting the second end 114 of the first segment coil 110 to the first end 123 of the second segment coil 120 and the planar conductive portion 116 (see FIG. 2B) connecting the second end 124 of the second segment coil 120 to the first end 113 of the first segment coil 110 may be formed. When the connection of the plurality of segment coils Sc is completed by the conductive portions (the linear conductive portion and the planar conductive portion), the phase coil 13 is formed. Thereafter, work of forming an insulation film on the connection portion between the segment coils Sc is performed to complete the stator 10. The stator 10 and the rotor 20 are supported by a support member (not illustrated), and thus the rotating electrical machine 1A is completed.

As described above, the method of manufacturing the rotating electrical machine 1A according to the present embodiment is a method of manufacturing the stator coil 12 by connecting the plurality of L-shaped segment coils Sc, the method including: a segment forming step (S11, S12) of forming a plurality of the first segment coils 110 and the second segment coils 120 in which one side of the L shape is the first region 111 and the other side of the L shape is the second region 112; a coil insertion step S13 of inserting the first segment coil 110 into the slot SL from one end side in the axial direction of the stator core 11 to cause the tip of the first region 111 to protrude out of the slot SL, disposing the second region 112 to extend from the first region 111 to one side in the circumferential direction, inserting the second segment coil 120 into the slot SL from the other end side in the axial direction of the stator core 11 to cause the tip of the first region 121 to protrude out of the slot SL, disposing the second region 122 to extend from the first region 121 to one side in the circumferential direction, and inserting the plurality of segment coils Sc into the slot SL to respectively dispose the first regions 111 and 121 of the plurality of segment coils Sc in a plurality of layers disposed in a line in the radial direction in the slot SL; and a coil connection step S14 of connecting the second end (114a) of one segment coil (for example, the first segment coil 110) and the first end (123a) of the other segment coil (for example, the second segment coil 120) outside the slot SL in two segment coils Sc disposed in the same layer (for example, the first layer L1) of two adjacent slots SL.

According to such a manufacturing method, since it is not necessary to form the segment coil Sc after inserting the segment coil Sc into the slot SL of the stator core 11, the number of manufacturing steps can be reduced and a manufacturing facility can be simplified. Since the connection portion between the segment coils Sc is located at the axial end of the coil end Ce of the stator coil 12, it is possible to provide the rotating electrical machine 1A that can be visually inspected and can be physically accessed. Since this manufacturing method includes the punching step S11 of punching the conductor plate 70 to form the conductor piece 71, the segment coil Sc having the coil end Ce (second region 112,122) having a complicated shape can be easily formed.

In this manufacturing method, since the conductor piece 71 is formed by punching the conductor plate 70 having a predetermined thickness, a thickness of the segment coil Sc formed by the conductor piece 71 is uniform as a whole. For example, the thickness of the in-slot conductor Cs and the thickness of the coil end Ce are substantially the same. As described above, by forming the segment coil Sc to be uniform in thickness as a whole, it is possible to prevent the electric resistance of the segment coil Sc from locally increasing.

Embodiment 2

Figure 9A:
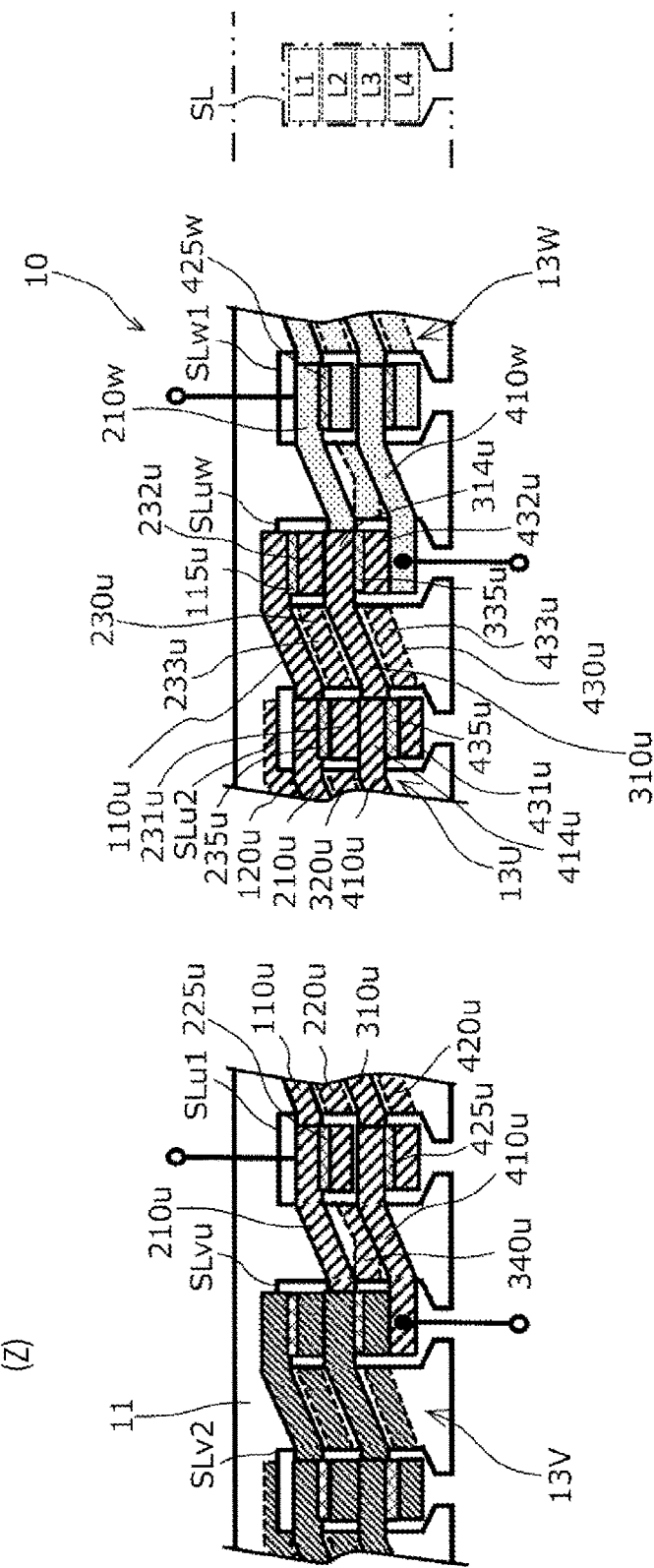
FIG. 9A is a partial plan view of a stator of Embodiment 2 as viewed from an axial direction.
Figure 9B:
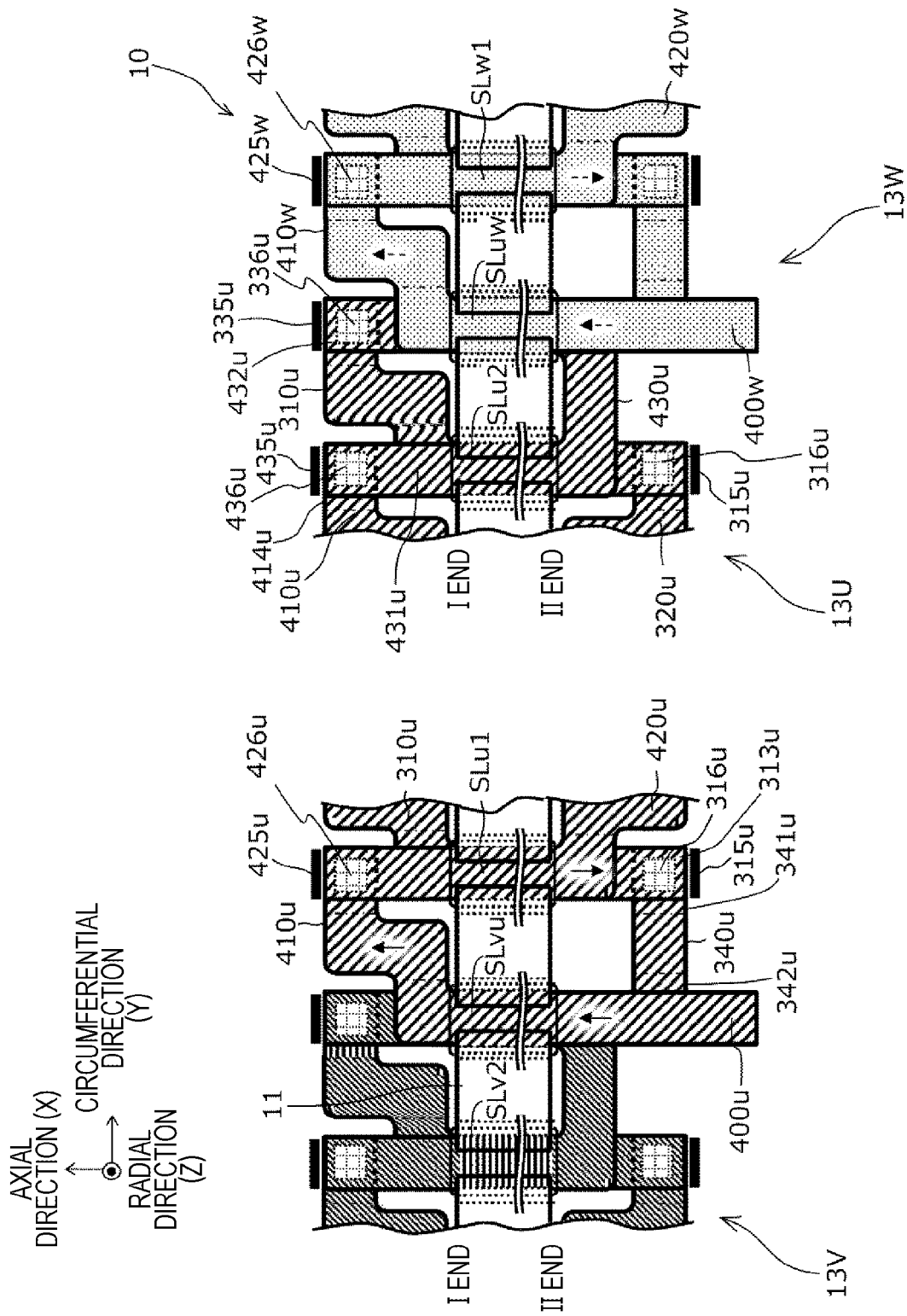
FIG. 9B is a partial side view of the stator of Embodiment 2 as viewed from a gap side.
Figure 9C:
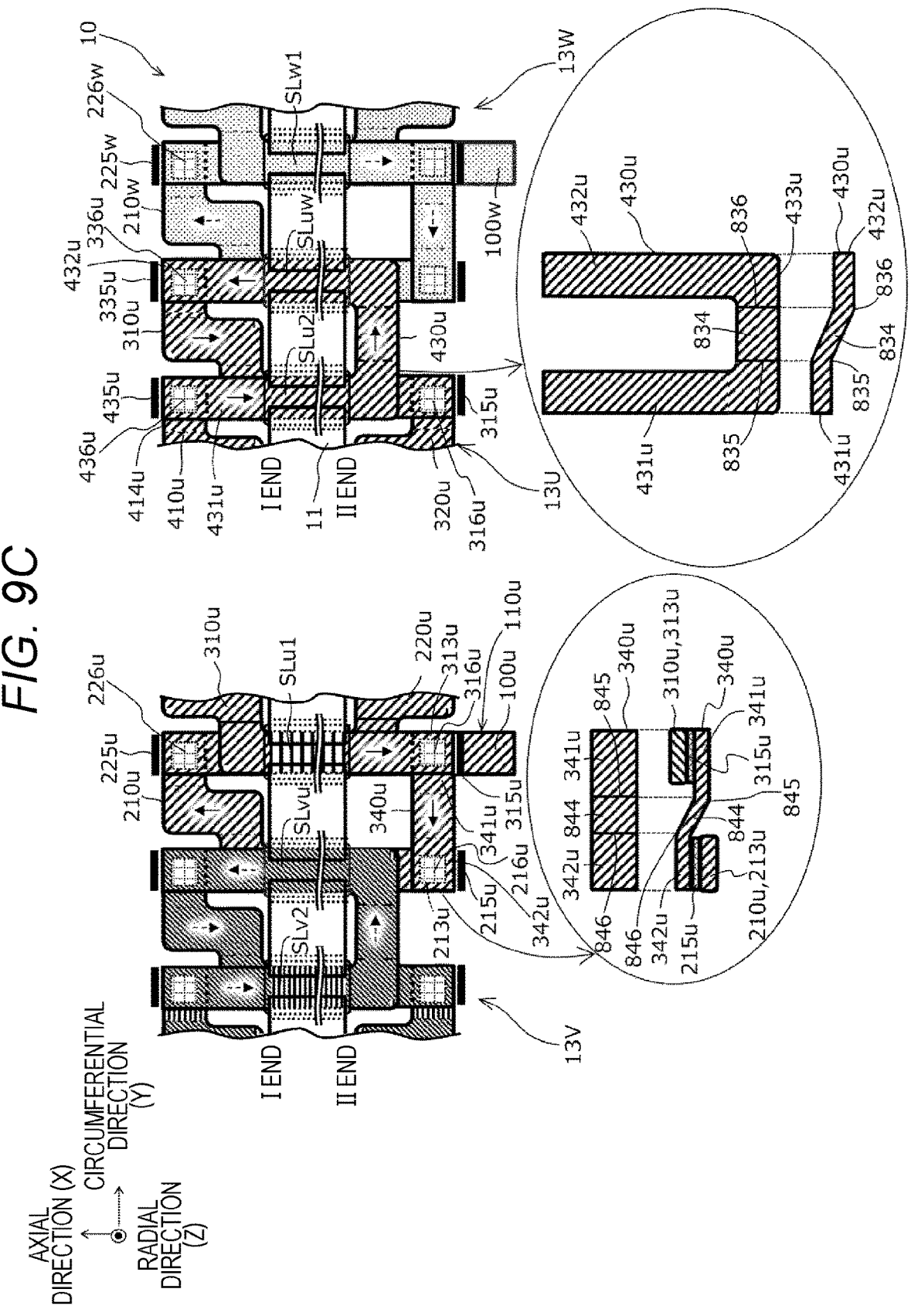
FIG. 9C is a partial side view of the stator of Embodiment 2 as viewed from the gap side, in which a segment coil having a lead-out portion and a second segment coil disposed in a fourth layer are omitted.

Embodiment 2 of the present invention will be described with reference to FIGS. 9A to 10B. In the drawings, the same or similar parts as those in Embodiment 1 are denoted by the same reference signs, and differences will be mainly described. FIG. 9A is a partial plan view of a stator 10 of Embodiment 2 as viewed from an axial direction. FIG. 9B is a partial side view of the stator 10 of Embodiment 2 as viewed from a gap 19 side. FIG. 9C is a partial side view of the stator 10 of Embodiment 2 as viewed from the gap 19 side, in which the segment coils 410u and 410w having lead-out portions 400u and 400w and second segment coils 420u and 420w disposed in a fourth layer L4 are omitted.

In Embodiment 2, an example of a structure in which two different types of phase coils 13 (see FIG. 1) in the rotating electrical machine 1A according to Embodiment 1 coexist in one slot will be described. The present invention also has a feature that the segment coils Sc can be disposed without interference between the phase coils 13 at the coil end Ce at which out-of-phase slots and in-phase slots are arranged in the circumferential direction, and thus a detailed structure thereof will be described.

One cycle of wave winding of the present invention is basically disposed in the same layer. However, as described above, in order to prevent the phase coils 13 from interfering with each other, it is necessary to have a configuration in which the phase coil transitions to an adjacent layer in one cycle of wave winding in the circumferential end slot of the in-phase coil (a slot coexisting with an out-of-phase coil). A detailed structure thereof will also be described below.

FIG. 9A illustrates a V-phase slot circumferential end SLv2, a VU-phase coexisting slot SLvu, a U-phase slot circumferential one end SLu1, a U-phase slot circumferential other end SLu2, a UW-phase coexisting slot SLuw, and a W-phase slot circumferential end SLw1 in order from the left. The slot SLvu is an out-of-phase slot in which two different types of phase coils 13 (the V-phase coil 13V and the U-phase coil 13U) are accommodated, and similarly, the slot SLuw is also an out-of-phase slot in which two different types of phase coils 13 (the U-phase coil 13U and the W-phase coil 13W) are accommodated. The slots SLv2, SLu1, SLu2, and SLw1 are in-phase slots in which only the phase coils 13 of the same type are accommodated. The same applies to FIGS. 9B and 9C.

Hereinafter, the letter u is added to the end of the reference sign of the U-phase segment coil, and the letter w is added to the W-phase segment coil. Since the configurations of the U-phase coil 13U, the V-phase coil 13V, and the W-phase coil 13W are similar, a disposition configuration of the U-phase coil 13U will be described as a representative.

As illustrated in FIGS. 9A to 9C, in the U-phase U-shaped coil 430u, a linear portion 431u is disposed in the fourth layer L4 of the slot SLu2, and a linear portion 432u is disposed in the third layer L3 of the slot SLuw. A coupling portion 433u of the U-shaped coil 430u is disposed on the II end side of the stator core 11. The coupling portion 433u is provided with bent portions 835 and 836. Therefore, the coupling portion 433u extends in the circumferential direction from the linear portion 431u toward the linear portion 432u and changes in a position in the radial direction. Therefore, the linear portions 431u and 432u can be respectively disposed in the layers (the fourth layer L4 and the third layer L3) adjacent to each other in the radial direction.

A right diagram of FIG. 9A, a right diagram of FIG. 9B, and a right diagram of FIG. 9C illustrate a configuration in which the U-phase slot and the W-phase slot are arranged in the circumferential direction. On the I end side of the stator core 11, a second end 414u of the first segment coil 410u disposed in the fourth layer L4 of a slot (not illustrated) adjacent on the left side of the slot SLu2 in the drawing is disposed on an axis of the third layer L3 of the slot SLu2 and is disposed to be adjacent to the tip of the linear portion 431u of the segment coil 430u having a U shape (hereinafter, a U-shaped coil; see FIG. 9C for U-shape, and details thereof will be described later) in the radial direction. The second end 414u of the first segment coil 410u and the tip of the linear portion 431u of the U-shaped coil 430u are electrically and mechanically connected via at least one of a linear conductive portion 435u and a planar conductive portion 436u.

On the I end side of the stator core 11, the second end 314u of the first segment coil 310u disposed in the third layer L3 of the slot SLu2 is disposed on the axis of the second layer L2 of the slot SLuw. The second end 314u of the first segment coil 310u is disposed to be adjacent to the tip of the linear portion 432u of the U-shaped coil 430u in the radial direction, and is electrically and mechanically connected via at least one of the linear conductive portion 335u and the planar conductive portion 336u.

Since a disposition configuration of the U-shaped coil 430u transitioning from the fourth layer L4 to the third layer L3 described above and a disposition configuration of the U-shaped coil 230u transitioning from the second layer L2 to the first layer L1 are similar, the description of the disposition configuration of the U-shaped coil 230u will be omitted.

On the other hand, the left diagram in FIG. 9A and the left diagram in FIG. 9B illustrate a configuration in which the V-phase slot and the U-phase slot are arranged in the circumferential direction. A segment coil 340u having an I shape (hereinafter, an I-shaped coil; see FIG. 9C for the I shape, and details thereof will be described later) is disposed on the II end side of the stator core 11. A connection end 341u of the I-shaped coil 340u is disposed on the axis of the second layer L2 of the slot SLu1, and a connection end 342u is disposed on the axis of the third layer L3 of the slot SLvu. The connection end 341u is disposed to be adjacent to the first end 313u of the first segment coil 310u disposed in the third layer L3 of the slot SLu1 in the radial direction, and is electrically and mechanically connected to the first end 313u via at least one of the linear conductive portion 315u and the planar conductive portion 316u. The connection end 342u is disposed to be adjacent to the first end 213u of the first segment coil 210u disposed in the second layer L2 of the slot SLvu in the radial direction, and is electrically and mechanically connected to the first end 213u via at least one of the linear conductive portion 215u and the planar conductive portion 216u.

As illustrated in FIGS. 9A and 9B, the segment coil 410u disposed in the fourth layer L4 of the slot SLvu and the segment coil 110u disposed in the first layer L1 of the slot SLu1 have the same configuration as that the first segment coil, but are provided with lead-out portions 400u and 100u extending in the axial direction from the linear portion. The lead-out portions 400u and 100u are connected to an external circuit (not illustrated) including an inverter device or the like via a wiring (not illustrated).

Here, configurations of the U-shaped coil 430u and the I-shaped coil 340u will be described in detail. As illustrated in FIG. 9C, the U-shaped coil 430u is a conductive member having a U shape, and is manufactured similarly to the first segment coil and the second segment coil, by punching the conductor plate 70 to manufacture a U-shaped conductor piece, and pressing the conductor piece. The U-shaped coil 430u includes a pair of linear portions 431u and 432u inserted into the slots SL adjacent in the circumferential direction, and a coupling portion 433u that couples ends of the pair of linear portions 431u and 432u. The pair of linear portions 431u and 432u are formed to be parallel to each other, and the coupling portion 433u is formed to be orthogonal to the pair of linear portions 431u and 432u. In the coupling portion 433u, the first bent portion 835 and the second bent portion 836 are formed such that radial positions of the pair of linear portions 431u and 432u are shifted by about one layer in a state in which the pair of linear portions 431u and 432u are inserted into the slots SL. An inclined portion 834 inclined with respect to the pair of linear portions 431u and 432u is formed between the first bent portion 835 and the second bent portion 836.

The I-shaped coil 340u is a conductive member having an I shape (rectangular shape), and is manufactured similarly to the first segment coil and the second segment coil, by punching the conductor plate 70 to manufacture an I-shaped conductor piece, and pressing the conductor piece. The I-shaped coil 340u has a connection end 341u connected to the first end 313u of one first segment coil 310u and a connection end 342u connected to the first end 213u of the other first segment coil 210u, of the pair of first segment coils inserted into the slots SL adjacent in the circumferential direction. The pair of connection ends 341u and 342u are formed to be parallel to each other. In the I-shaped coil 340u, the first bent portion 845 and the second bent portion 846 are formed such that radial positions of the pair of connection ends 341u and 342u are shifted by about one layer. An inclined portion 844 inclined with respect to the pair of connection ends 341u and 342u is formed between the first bent portion 845 and the second bent portion 846.

As described above, the overall shape of the U-phase coil 13U configured with the plurality of segment coils is as follows. In the fourth layer L4, the U-phase coil 13U extends in a wave shape (the left diagram in FIG. 9B) toward one side in the circumferential direction (the right side in the drawing) with the lead-out portion 400u as a start end, and is folded back to the other side in the circumferential direction (the left side in the drawing) while positionally changing (transitioning) from the fourth layer L4 to the third layer L3 due to the U-shaped coil 430u (the right diagram in FIG. 9C). In the third layer L3, the U-phase coil 13U extends in a wave shape toward the other side in the circumferential direction (the left side in the drawing), and is folded back to one side in the circumferential direction (the right side in the drawing) while positionally changing (transitioning) from the third layer L3 to the second layer L2 due to the I-shaped coil 340u (the left diagram in FIG. 9C). In the second layer L2, the U-phase coil 13U extends in a wave shape toward one side in the circumferential direction (the right side in the drawing), and is folded back to the other side in the circumferential direction (the left side in the drawing) while positionally changing (transitioning) from the second layer L2 to the first layer L1 due to the U-shaped coil 230u. In the first layer L1, the U-phase coil 13U extends in a wave shape toward the other side in the circumferential direction (the left side in the drawing), and terminates at the lead-out portion 100u.

Therefore, a current flowing into the U-phase coil 13U from the lead-out portion 400u located in the U-phase fourth layer L4 flows toward one side in the circumferential direction (the right side in the drawing) through the segment coil (410u, 420u) of the fourth layer L4 as indicated by a solid arrow in the left diagram in FIG. 9B. Subsequently, as indicated by a solid arrow in the right diagram in FIG. 9C, the current flows to the first segment coil 310u of the third layer L3 through the segment coil 410u of the fourth layer L4 and the U-shaped coil 430u, and is folded back to the other side (the left side in the drawing) in the circumferential direction. Subsequently, as indicated by a solid arrow in the right diagram in FIG. 9C, the current flows toward the other side in the circumferential direction through the segment coil (310u, 320u) of the third layer L3 (the left side in the drawing). Subsequently, as indicated by a solid arrow in the left diagram in FIG. 9C, the current flows to the first segment coil 210u disposed in the second layer L2 through the segment coil 310u of the third layer L3 and the I-shaped coil 340u, and is folded back to one side in the circumferential direction (the right side in the drawing) Subsequently, as indicated by a solid arrow in the left diagram in FIG. 9C, the current flows toward one side in the circumferential direction (the right side in the drawing) through the segment coil (210u, 220u) disposed in the second layer L2. Subsequently, the current flows to the first segment coil 110u of the first layer L1 through the U-shaped coil 230u illustrated in the right diagram in FIG. 9A, and is folded back to the other side in the circumferential direction (the left side in the drawing). The current flowing toward the other circumferential direction (the left side in the drawing) through the segment coil (110u, 120u) of the first layer L1 flows to an external circuit through the lead-out portion 100u of the segment coil 110u.

As described above, the U-phase coil 13U is configured by connecting the wavy coils 31 to 34 of the respective layers (L1 to L4) via the U-shaped coils 430u and 230u and the I-shaped coil 340u. The V-phase coil 13V and the W-phase coil 13W have the same configuration.

Figure 10A:
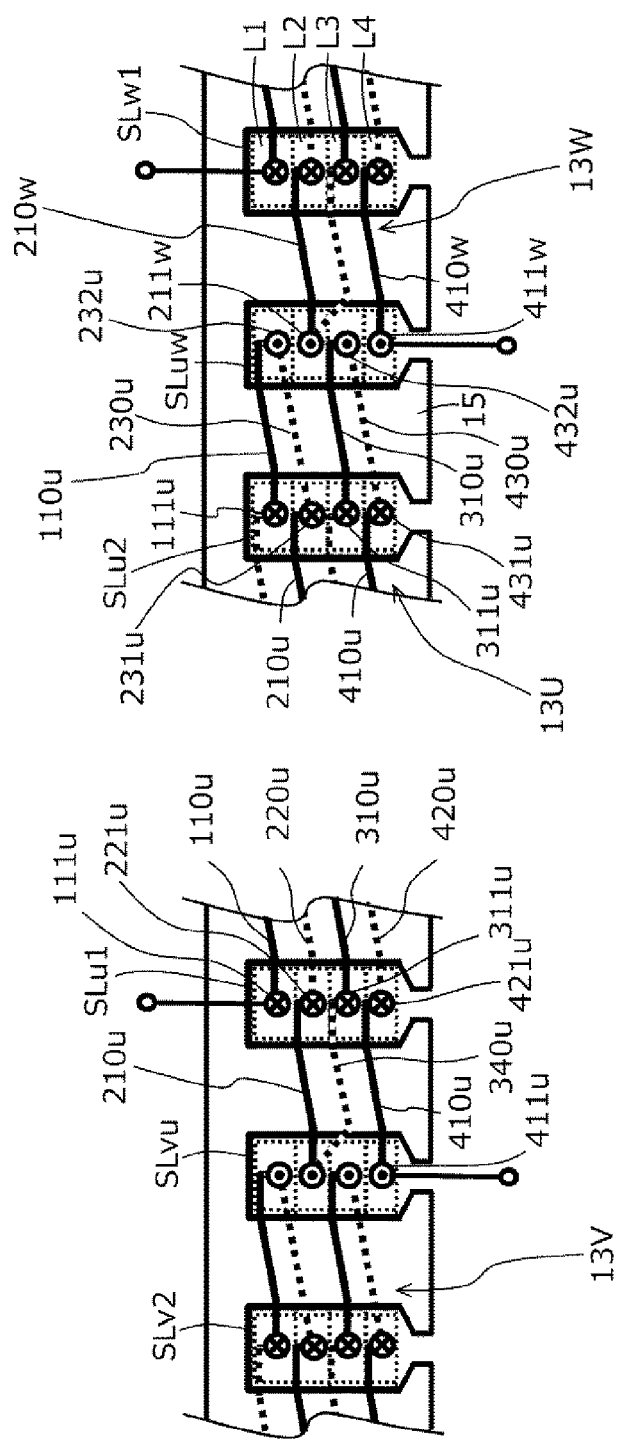
FIG. 10A is a circuit diagram corresponding to a configuration of a phase coil in FIG. 9A, and is a circuit diagram of the stator as viewed from the axial direction.
Figure 10B:
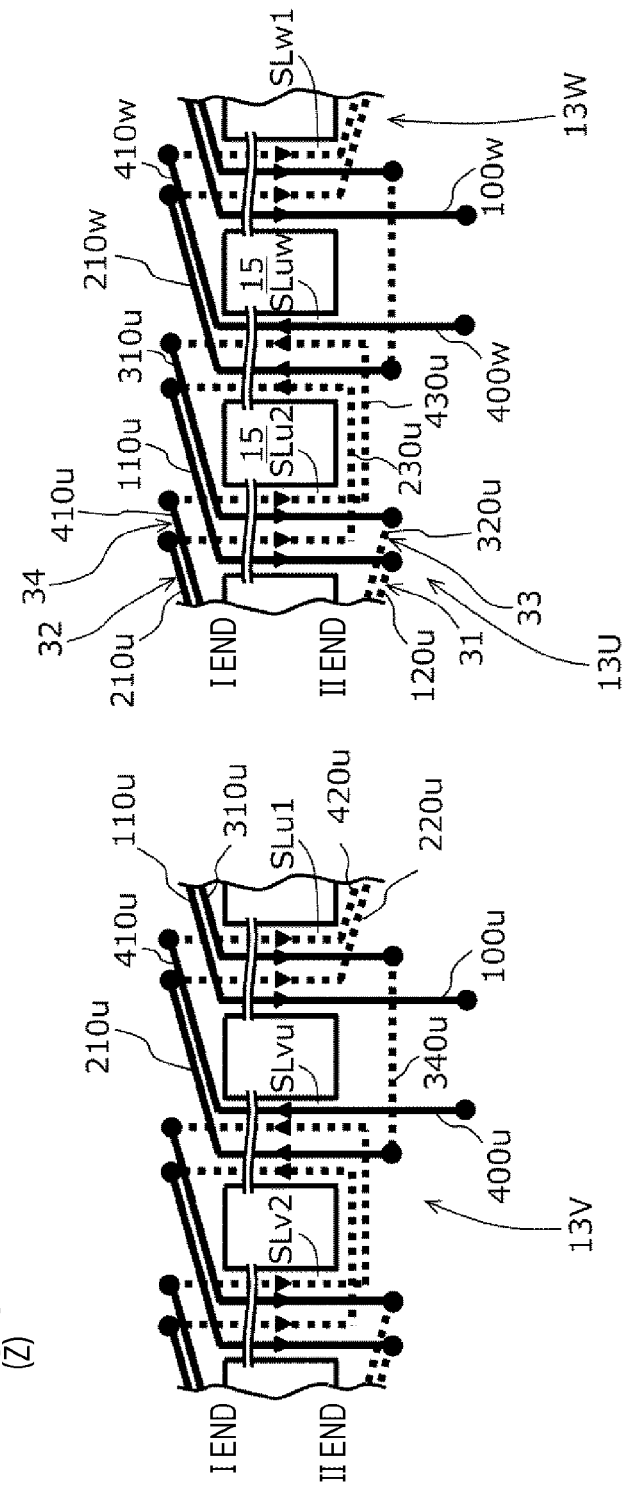
FIG. 10B is a circuit diagram corresponding to a configuration of a phase coil in FIG. 9B, and is a circuit diagram of the stator as viewed from the gap side.

FIGS. 10A and 10B are circuit diagrams corresponding to the configuration of the phase coil 13 in FIGS. 9A and 9B. FIG. 10A is a circuit diagram of the stator 10 as viewed from the axial direction, and FIG. 10B is a circuit diagram of the stator 10 as viewed from the gap 19 side. A filled circle "e" in FIG. 10B schematically represents a connection portion of the segment coil Sc, and an arrow represents a direction of a current. In FIGS. 10A and 10B, the first segment coil is indicated by a solid line, and the second segment coil, the U-shaped coil, and the I-shaped coil are indicated by dashed lines.

As illustrated in FIGS. 10A and 10B, in the present embodiment, the U-shaped coils 230u and 430u are provided to configure a folded portion on one end side in the circumferential direction of the U-phase coil 13U, and the I-shaped coil 340u is provided to configure a folded portion on the other end side in the circumferential direction of the U-phase coil 13U.

In the slot SLuw that is an out-of-phase slot, the W-phase first segment coil 410w is disposed in the fourth layer L4, the linear portion 432u of the U-phase U-shaped coil 430u is disposed in the third layer L3, the W-phase first segment coil 210w is disposed in the second layer L2, and the linear portion 232u of the U-phase U-shaped coil 230u is disposed in the first layer L1.

Currents in the same direction respectively flow through the linear portions 232u and 432u of the plurality of U-shaped coils 230u and 430u disposed in the slot SLuw which is an out-of-phase slot. Therefore, currents in the same phase (U phase) intensively flow in the same direction around the teeth 15 disposed between the out-of-phase slot (slot SLuw) and the in-phase slot (slot SLu2). Currents in the same direction flow through the linear portions of the first regions 211$w$ and 411$w$ of the plurality of segment coils 210$w$ and 410$w$ disposed in the slot SLuw that is an out-of-phase slot. Therefore, currents in the same phase (W phase) intensively flow in the same direction around the teeth 15 disposed between the out-of-phase slot (slot SLuw) and the in-phase slot (slot SLw1). That is, according to the present embodiment, it is possible to form a current distribution of concentrated winding and fractional slots.

As described above, according to Embodiment 2, it is possible to prevent the phase coils 13 from interfering with each other at a position where the out-of-phase coils are arranged in the radial direction in the rotating electrical machine 1A having the concentrated winding-fractional slot configuration. In Embodiment 2, both ends of the U-shaped coil are connected to the respective second ends of the pair of first segment coils through laser welding or the like outside the slot SL, and both ends of the I-shaped coil are connected to the respective first ends of the pair of first segment coils outside the slot SL, so that the phase coil 13 is formed. That is, according to the present embodiment, it is possible to extremely easily dispose the segment coils Sc and connect the segment coils Sc to each other.

Embodiment 3

Figure 11:
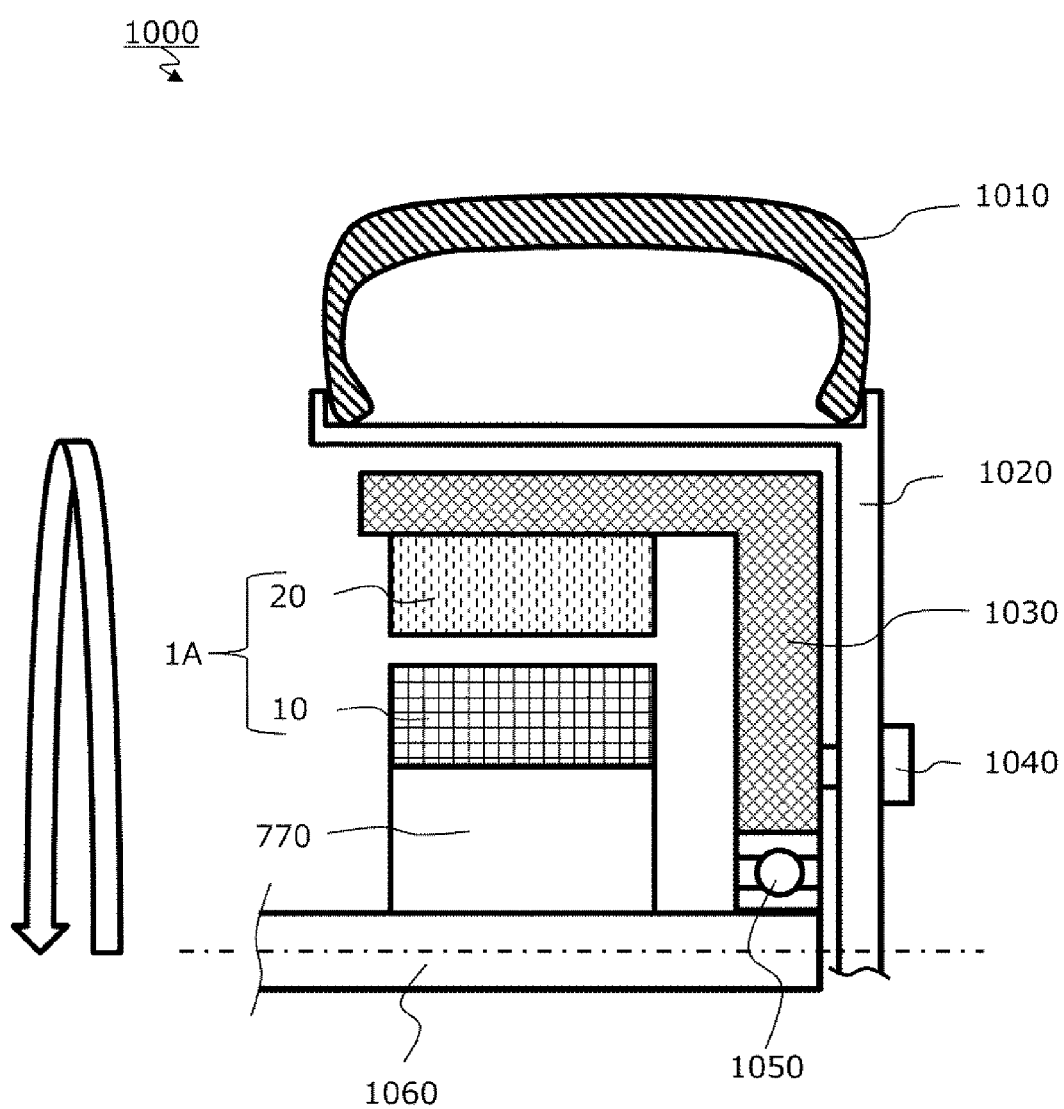
FIG. 11 is a schematic sectional view of an in-wheel type electric wheel according to Embodiment 3.

FIG. 11 is a schematic sectional view of an in-wheel type electric wheel 1000 according to Embodiment 3 of the present invention. The electric wheel 1000 includes the outer-rotation-type rotating electrical machine 1A described in the above Embodiments 1 and 2 inside a wheel 1020. The rotor 20 of the rotating electrical machine 1A is connected to a rotor frame 1030. The rotor frame 1030 is connected to the wheel 1020 via a connection member 1040. A tire 1010 is fitted to the wheel 1020. The wheel 1020 and the rotor 20 are rotatably supported at a shaft 1060. The wheel 1020 or the rotor frame 1030 is connected to the shaft 1060 via a bearing 1050.

On the other hand, the stator 10 of the rotating electrical machine 1A is fixedly supported at the shaft 1060 by a support member (not illustrated), and an electric circuit unit 770 is also mounted on the support member. The electric circuit unit 770 supplies electric power to the stator 10 to rotate the rotor 20. Rotation of the rotor 20 is transmitted to the wheel 1020 via the rotor frame 1030 and the connection member 1040. The wheel 1020 is rotated about the shaft 1060.

By applying the rotating electrical machine 1A described in the above Embodiments 1 and 2 in which high efficiency and high output are realized without causing an increase in the size to the electric wheel 1000, it is possible to provide the highly efficient and highly reliable electric wheel 1000 without causing an increase in the size and manufacturing cost of the electric wheel 1000.

The electric wheel 1000 directly drives the wheel 1020 with the rotating electrical machine 1A without using a gear. In a conventional electric wheel that transmits torque of a rotating electrical machine to a wheel via a gear, components such as a bearing are required to support the gear, and thus there is room for improvement in terms of the number of components. The conventional electric wheel has a problem that gear wear and noise are large.

In contrast, in the electric wheel 1000 including the rotating electrical machine 1A described in Embodiments 1 and 2, the rotating electrical machine 1A is directly connected to the wheel 1020 without using a gear. This eliminates the need for maintenance in consideration of gear wear and also eliminates noise generated from the gear. The number of bearings can be reduced. As a result, the risk of wear of the bearing can be reduced, and an amount of maintenance work for grease replacement or the like of the bearing can also be reduced. The gearless configuration enables reduction in size and weight of the electric wheel 1000. Consequently, since a so-called unsprung load is reduced, drivability and steerability of the electric wheel 1000 are improved.

Embodiment 4

Figure 12:
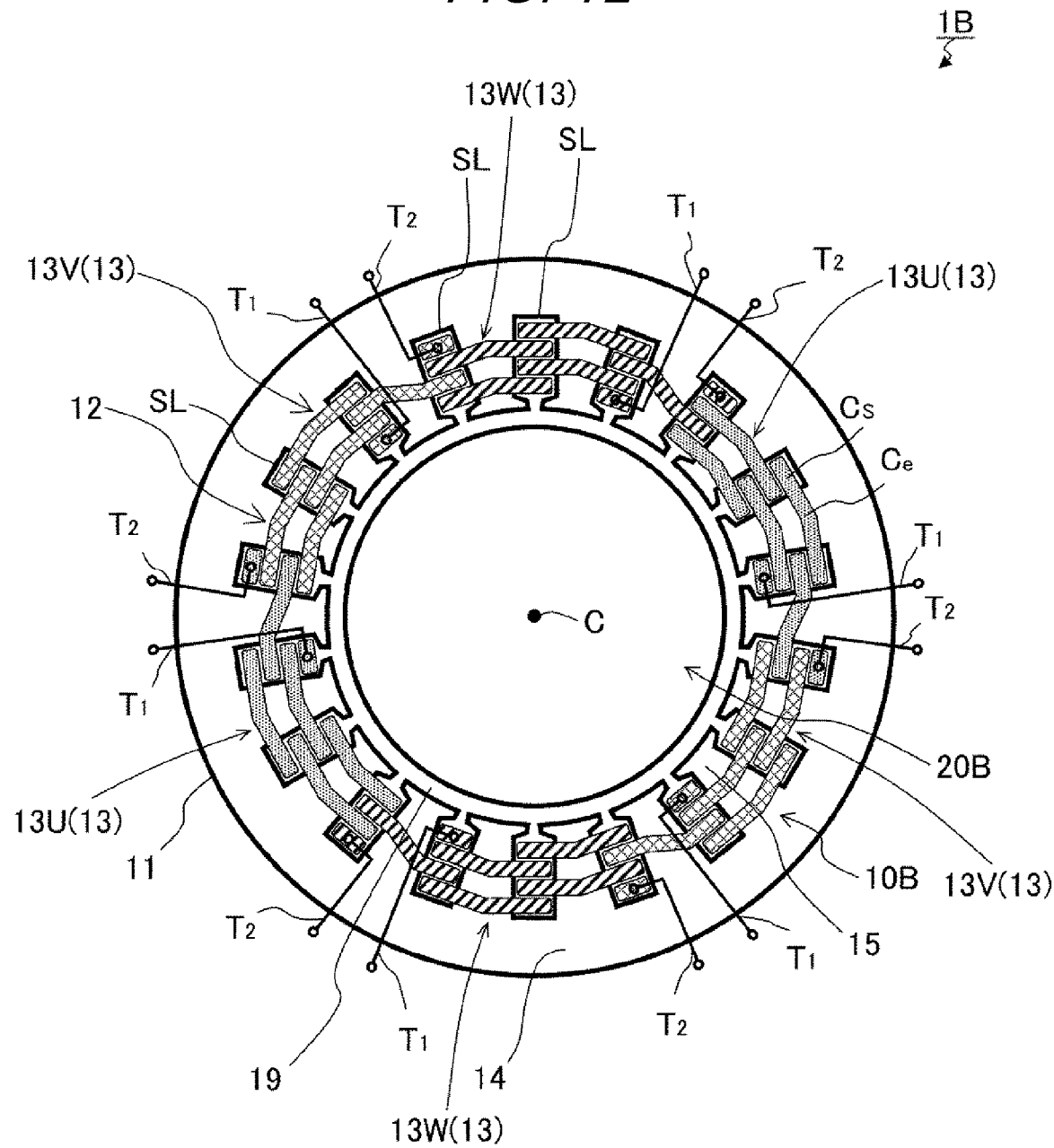
FIG. 12 is a schematic plan view of a rotating electrical machine having an inner-rotation-type rotor according to Embodiment 4 as viewed from an axial direction.

In Embodiments 1 to 3 described above, the rotating electrical machine 1A including the outer rotor has been described, but the present invention is not limited thereto. The present invention may be applied to a rotating electrical machine having an inner-rotation-type rotor. FIG. 12 is a schematic plan view of a rotating electrical machine 1B including an inner-rotation-type rotor 20B as viewed from the axial direction. The rotating electrical machine 1B includes a cylindrical stator 10B and a cylindrical rotor 20B disposed inside the stator 10B. In the configuration of the rotating electrical machine 1B, a disposition relationship between the stator 10B and the rotor 20B is opposite to that of the outer-rotation-type rotating electrical machine 1A described in Embodiment 1, but a configuration of the segment coil Sc is similar to that in Embodiments 1 and 2, and thus the description thereof will be omitted.

Embodiment 5

Figure 13:
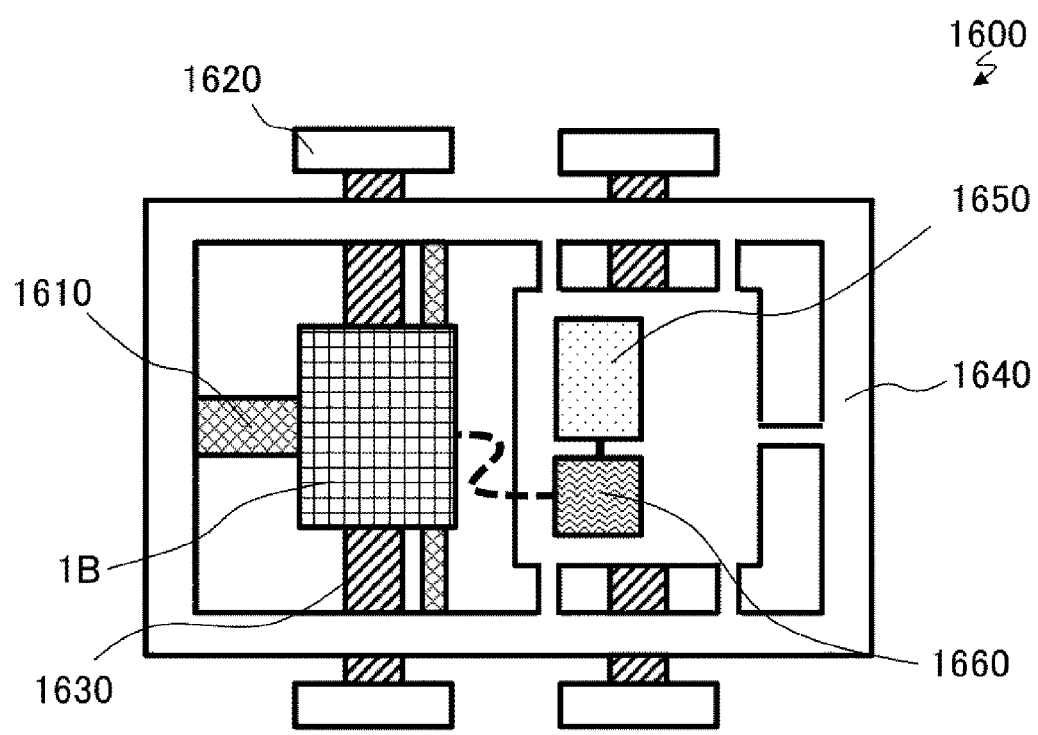
FIG. 13 is a schematic plan view of a vehicle according to Embodiment 5.

A vehicle 1600 according to Embodiment 5 of the present invention will be described with reference to FIG. 13. FIG. 13 is a schematic plan view of a vehicle 1600 according to Embodiment 5. The vehicle 1600 according to Embodiment 5 is equipped with the inner-rotation-type rotating electrical machine 1B described in Embodiment 4. The vehicle 1600 includes the inner-rotation-type rotating electrical machine 1B described in Embodiment 4, a battery 1650, and a power conversion device 1660 that converts DC power of the battery 1650 into AC power and supplies the AC power to the rotating electrical machine 1B. The rotating electrical machine 1B is fixedly supported at a vehicle body frame 1640 by a support member 1610. The rotor 20B of the rotating electrical machine 1B is directly connected to an axle 1630. The torque of the rotating electrical machine 1B is transmitted to vehicle wheels 1620 via the axle 1630 without using gears, and the vehicle wheels 1620 are driven.

Since the rotating electrical machine 1B mounted on the vehicle 1600 achieves high efficiency and high output, the vehicle can be directly driven. Therefore, according to Embodiment 5, it is possible to achieve the effect associated with the gearless configuration, similarly to Embodiment 3. Since the size of the rotating electrical machine 1B can be reduced, it is possible to reduce the size and weight of the vehicle 1600 by a synergistic effect with the gearless configuration.

The following modification examples are also within the scope of the present invention, and it is also possible to combine configurations described in the modification examples with the configuration described in the above-described embodiments, combine configurations described in the above different embodiments, or combine configurations described in the following different modification examples.

Modification Example 1

Figure 14:
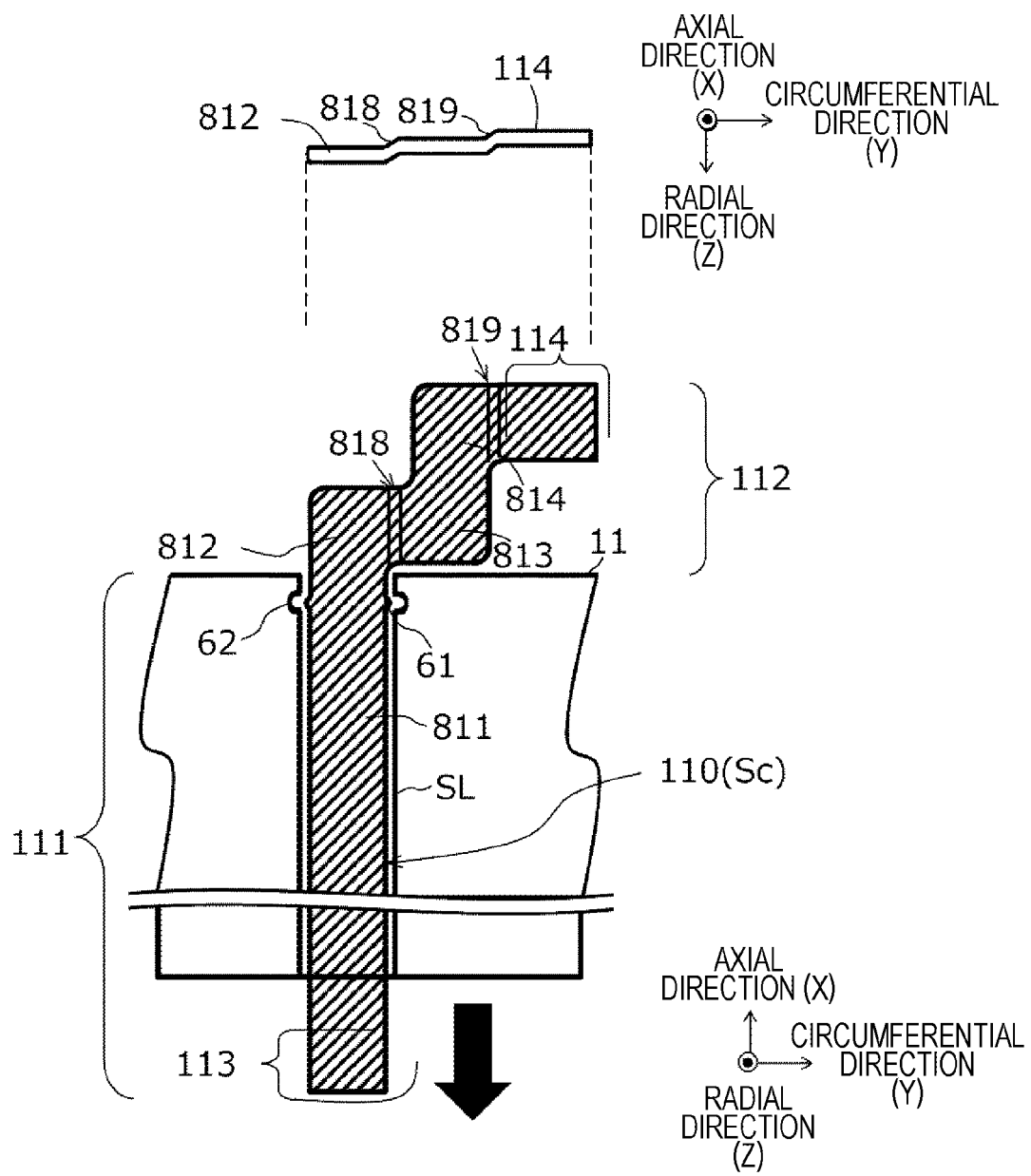
FIG. 14 is a view illustrating a state in which a first segment coil according to Modification Example 1 is inserted into a slot.

A segment coil Sc according to Modification Example 1 of the present embodiment will be described with reference to FIG. 14. FIG. 14 is a diagram illustrating a state in which a first segment coil 110 according to Modification Example 1 is inserted into a slot. As illustrated in FIG. 14, in the first segment coil 110 according to Modification Example 1, a protrusion 61 protruding outward (in the circumferential direction) is formed on both side parts of the linear portion 811 in the circumferential direction. Although not illustrated, the protrusion 61 is also formed in the second segment coil 120. In the slot SL, a recess 62 into which the protrusion 61 of the segment coil Sc is fitted is formed.

As a result, when the segment coil Sc is inserted to a predetermined position in the slot SL, the protrusion 61 and the recess 62 are fitted into each other, and the segment coil Sc is positioned. Therefore, according to Modification Example 1, the segment coil Sc can be easily positioned with respect to the slot SL. Since the position of the segment coil Sc is held by fitting the protrusion 61 and the recess 62, a jig for fixing the segment coil Sc at the time of welding work is unnecessary. Therefore, according to Modification Example 1, it is possible to reduce the number of steps in the coil insertion step S13 and the coil connection step S14. The recess 62 may be provided in the insulation material 7.

The recess 62 may be omitted. In this case, since the protrusion 61 comes into contact with the inner surface of the slot SL, the segment coil Sc is prevented from falling off from the slot SL, and thus the segment coil Sc can be held at any position.

Modification Example 2

A segment coil Sc according to Modification Example 2 of the present embodiment will be described with reference to FIG. 14. FIG. 14 is a diagram of the first segment coil 110 as viewed from the axial direction. In the above embodiment, an example in which two bent portions are provided in the first segment coil 110 has been described, but the present invention is not limited thereto. Three or more bent portions may be provided. In the first segment coil 110 illustrated in FIG. 14, an inclined portion 818 is formed between the base 812 and the circumferential extension 813. In the first segment coil 110, an inclined portion 819 is formed between the axial extension 814 and the second end 114. That is, in Modification Example 2, the bent portions are respectively formed between the base 812 and the inclined portion 818, between the inclined portion 818 and the circumferential extension 813, between the axial extension 814 and the inclined portion 819, and between the inclined portion 819 and the second end 114.

The pair of inclined portions 818 and 819 are formed in parallel to each other. The base 812, the circumferential extension 813, the axial extension 814, and the second end 114 are disposed in parallel. The second end 114 is disposed at a position shifted in the radial direction by about one layer with respect to the base 812. The second segment coil 120 may have the same configuration. That is, positions of the second regions 112 and 122 of the first segment coil 110 and the second segment coil 120 according to Modification Example 2 in the radial direction change stepwise between the linear portions 811 and 821 and the second ends 114 and 124 by forming the plurality of bent portions (four in the present Modification Example).

Modification Example 3

In the above embodiment, an example in which the second region of the segment coil has a stepwise shape when viewed from the radial direction has been described, but the present invention is not limited thereto. The segment coil may have any shape that can avoid interference with an adjacent segment coil outside the slot SL. Hereinafter, modification examples of the segment coil will be described by exemplifying the first segment coil 210a disposed in the second layer L2 of the first slot SL1 and the first segment coil 110b disposed in the first layer L1 of the second slot SL2.

Modification Example 3-1

Figure 15A:
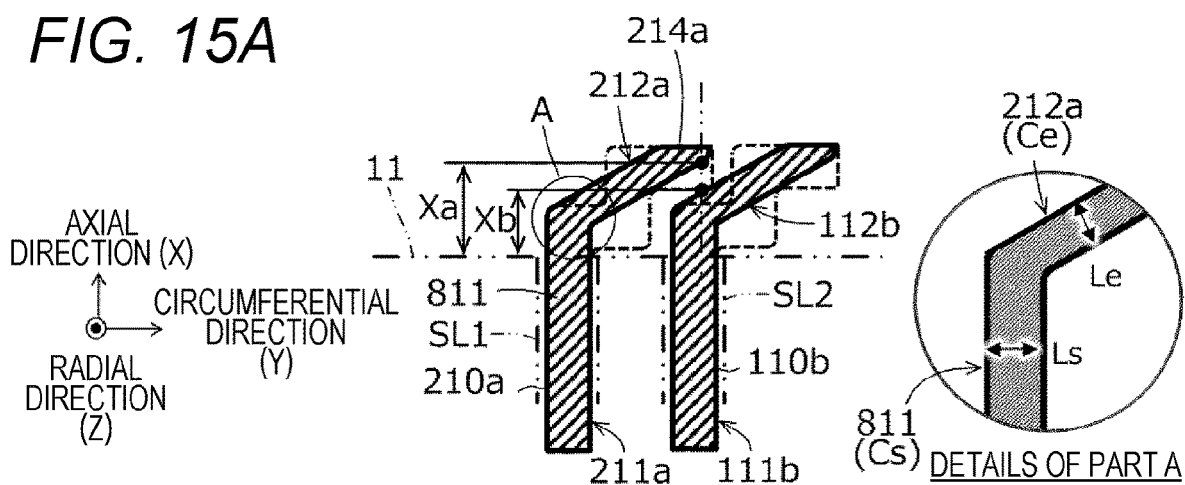
FIG. 15A is a view illustrating a shape of a first segment coil according to Modification Example 3-1.

As illustrated in FIG. 15A, in the first segment coil 210a, a second region 212a may be provided to be inclined with respect to a first region 211a. The second region 212a extends not only in the circumferential direction from the linear portion 811 but also in the axial direction, and separates a second end 214a from the end surface of the stator core 11. In Modification Example 3-1, with respect to a distance Xa between the axial inner end surface of the second end 214a and the axial end surface of the stator core 11, a distance Xb between the axial outer end surface of the second region 112b of the adjacent first segment coil 110b and the axial end surface of the stator core 11 is configured to satisfy the relationship of Xa>Xb. As a result, a space in which the second region 112b of the adjacent first segment coil 110b can be disposed is secured between the second end 214a of the first segment coil 210a and the stator core 11.

The segment coil Sc may be formed such that a lateral width (a length of the wide portion) Ls of the in-slot conductor Cs (that is, the linear portion 811) disposed inside the slot SL and a lateral width (a length of the wide portion) Le of the coil end Ce (for example, the second region 212a) disposed outside the slot SL are the same or different in the cross section orthogonal to the energization direction. In a case where a disposition space of the coil end Ce is limited, the coil end Ce can be made compact by setting Ls>Le, and a size of the rotating electrical machine 1A can be suppressed from increasing. On the other hand, in a case where there is a margin in the disposition space of the coil end Ce, by setting Ls<Le, the coil sectional area of the coil end Ce increases, and thus it is possible to reduce heat generation due to the winding resistance and the copper loss. Similarly in the above embodiment, the segment coil may be formed such that a lateral width of the second region is different from a lateral width of the linear portion.

Modification Example 3-2

Figure 15B:
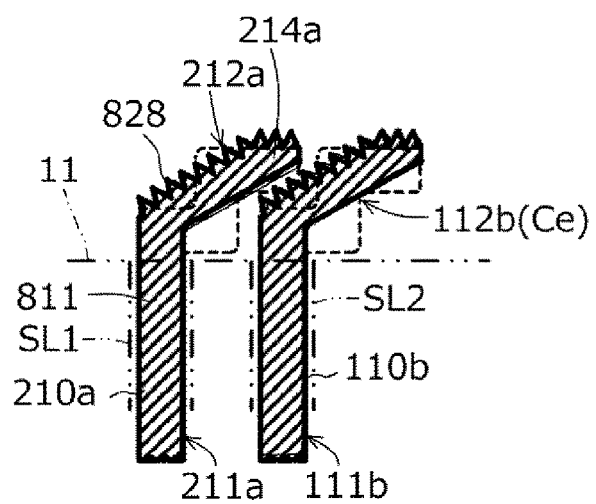
FIG. 15B is a view illustrating a shape of a first segment coil according to Modification Example 3-2.

FIG. 15B is a diagram illustrating a shape of the first segment coil 210a according to Modification Example 3-2. In the first segment coil 210a according to Modification Example 3-2, similarly to Modification Example 3-1, the second region 212a is provided to be inclined with respect to the first region 211a.

A serrated uneven portion 828 is formed in the second region 212a. In the uneven portion 828, a plurality of protruding portions are formed at intervals, and thus depression portions are formed between the protruding portions. As a result, since a heat dissipation area of the second region 212a configuring the coil end Ce of the segment coil 210a is enlarged, the cooling performance of the segment coil 210a is improved.

Modification Example 3-3

Figure 15C:
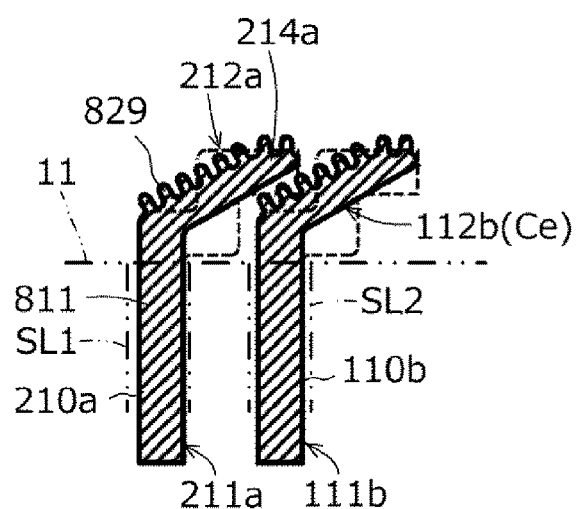
FIG. 15C is a view illustrating a shape of a first segment coil according to Modification Example 3-3.

FIG. 15C is a diagram illustrating a shape of the first segment coil 210a according to Modification Example 3-3. In the first segment coil 210a according to Modification Example 3-3, similarly to Modification Example 3-1, the second region 212a is provided to be inclined in the circumferential direction with respect to the first region 211a.

A pleated uneven portion 829 is formed in the second region 212a. In the uneven portion 829, a plurality of protruding portions are formed at intervals, and thus depression portions are formed between the protruding portions. As a result, since a heat dissipation area of the second region 212a configuring the coil end Ce of the segment coil 210a is enlarged, the cooling performance of the segment coil 210a is improved.

Modification Example 4

A position where the first segment coil and the second segment coil are connected via the conductive portion (the linear conductive portion or the planar conductive portion) is not limited to the above embodiment.

Modification Example 4-1

Figure 16A:
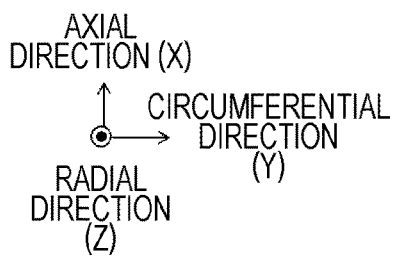
FIG. 16A is a view illustrating a modification example of a connection position between a first segment coil and a second segment coil.
Figure 16A:
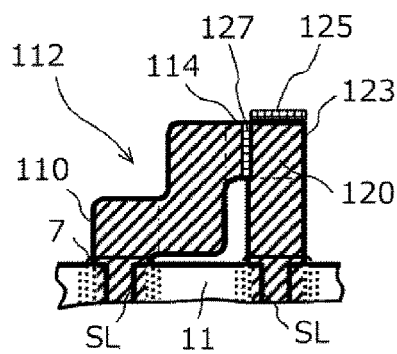

In the example illustrated in FIG. 16A, the linear conductive portion 127 is formed along the circumferential side portion of the first end 123 of the second segment coil 120. The linear conductive portion 127 connects the side portion of the first end 123 of the second segment coil 120 to the wide surface of the second end 114 of the first segment coil 110 facing in the radial direction. The linear conductive portion 127 is formed, for example, by applying a laser or an electron beam from the radial direction.

Modification Example 4-2

Figure 16B:
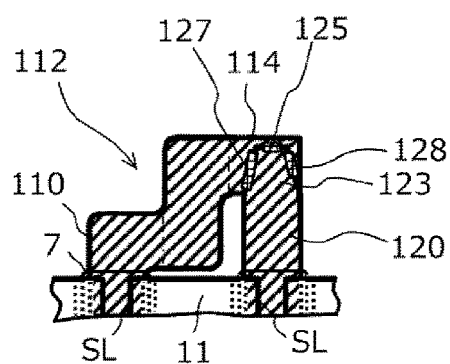
FIG. 16B is a view illustrating another modification example of the connection position between the first segment coil and the second segment coil.

In the example illustrated in FIG. 16B, the first end 123 of the second segment coil 120 is formed such that the lateral width becomes narrower toward the tip thereof, and a plurality of linear conductive portions 125, 127, and 128 are formed along the outer circumferential portions (both sides in the circumferential direction and the tip in the axial direction) of the first end 123. The linear conductive portions 125, 127, and 128 connect the outer circumferential portion of the first end 123 of the second segment coil 120 to the wide surface of the second end 114 of the first segment coil 110 facing in the radial direction. The linear conductive portions 125, 127, and 128 are formed, for example, by applying a laser or an electron beam from the radial direction.

As described above, a position where the first segment coil and the second segment coil are connected may be appropriately set.

Modification Example 5

In the above embodiment, an example in which the bent portions 815 and 816 are formed in the second region 112 of the segment coil 110 through a pressing process has been described, but the present invention is not limited thereto. The second region 112 may be formed to extend from the linear portion 811 toward one side in the circumferential direction and change in a position in the radial direction. An example in which the second region 112 of the segment coil 110 is formed in a step shape (crank shape) by punching has been described, but the present invention is not limited thereto. The second region 112 may be formed to extend from the linear portion 811 toward one side in the circumferential direction and change in a position in the axial direction.

Figure 17:
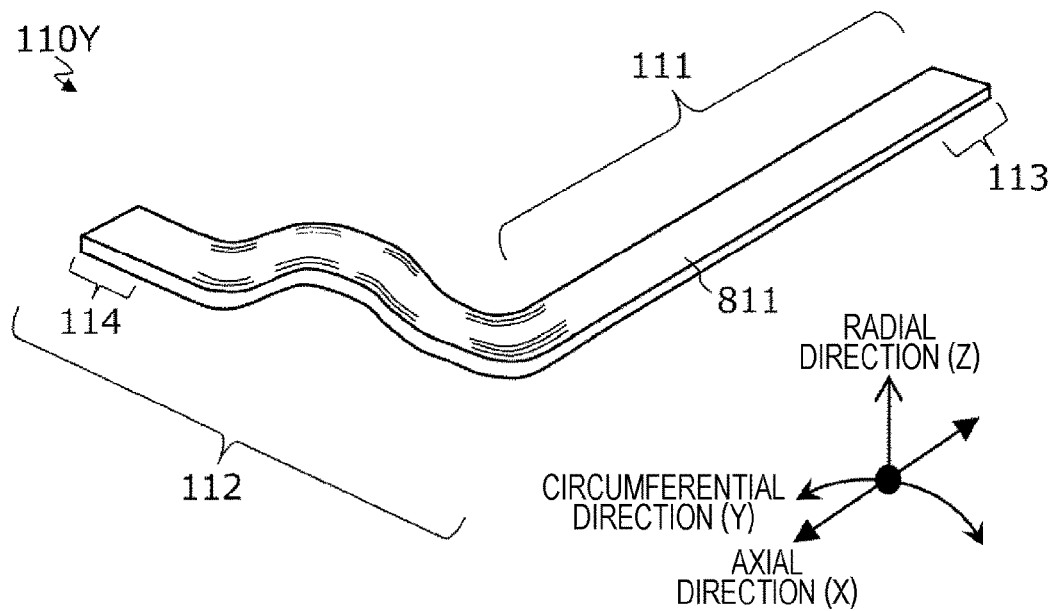
FIG. 17 is a view illustrating a shape of a first segment coil according to Modification Example 5.

A first segment coil 110Y illustrated in FIG. 17 is formed such that the second region 112 extends from the linear portion 811 toward one side in the circumferential direction and changes in a position in the radial direction and the axial direction by bending a rectangular plate-shaped material. According to Modification Example 5, similarly to the above embodiment, when the first segment coil 110Y is assembled to the stator core 11, it is possible to prevent the adjacent first segment coils from interfering with each other outside the slot SL.

Modification Example 6

In the above embodiment, an example in which the punching step (S11) and the pressing step (S12) are separately performed has been described, but the present invention is not limited thereto. In the method of manufacturing the segment coil, the punching step (S11) and the pressing step (S12) can be performed as one step by using a mold on which a punching process and a pressing process can be simultaneously performed. As a result, the number of manufacturing steps of the segment coil can be reduced.

Modification Example 7

In Embodiment 5, an example in which the vehicle wheels 1620 are directly driven by the rotating electrical machine 1B has been described, but the present invention is not limited thereto. The present invention can also be applied to the vehicle 1600 in which gears are provided between the rotating electrical machine 1B and the vehicle wheels 1620.

Modification Example 8

In the above embodiment, an example in which the rotating electrical machines 1A and 1B are applied to a vehicle has been described, but the present invention is not limited thereto. The present invention can be applied to various electric devices.

Modification Example 9

In the above embodiment, an example in which the rotating electrical machines 1A and 1B include the phase coils 13 of the U phase, the V phase, and the W phase has been described, but the present invention is not limited thereto. The present invention may be applied to a rotating electrical machine including two or more phase coils (for example, 5-phase coils) having at least different phases.

Although the embodiments of the present invention have been described above, the above embodiments merely show a part of the application example of the present invention, and the technical scope of the present invention is not intended to be limited to specific configurations of the above embodiments.

REFERENCE SIGNS LIST 10, 10B stator
11 stator core 12 stator coil
13 phase coil
15 tooth
15a flange
19 gap (void)
20, 20B rotor
31, 32, 33, 34 wavy coil
38 crest portion
39 valley portion
115, 125 linear conductive portion (conductive portion)
116, 126 planar conductive portion (conductive portion)
61 protrusion
1A, 1B rotating electrical machine
110 first layer first segment coil
111 first region
811 linear portion
810 projection
113 first end
112 second region
812 base
813 circumferential extension
814 axial extension
114 second end
815, 816 bent portion
120 first layer second segment coil
121 first region
821 linear portion
820 projection
123 first end
122 second region
822 base
823 circumferential extension
824 axial extension
124 second end
825, 826 bent portion
230, 430 U-shaped coil (segment coil)
340 I-shaped coil (segment coil)
100, 400 lead-out portion
210 second layer first segment coil
212 second region
214 second end
310 third layer first segment coil
312 second region
314 second end
828 protruding portion
410 fourth layer first segment coil
412 second region
414 second end
829 protruding portion
1000 electric wheel
1020 wheel
1600 vehicle
1620 vehicle wheel
1650 battery
1660 power conversion device
Ce coil end (out-of-slot conductor)
Cs in-slot conductor
Le lateral width
Sc segment coil
SL slot

The invention claimed is:

1. A rotating electrical machine comprising:
a stator including a stator core having a plurality of slots and
a plurality of segment coils respectively disposed in the plurality of slots of the stator core, wherein
the plurality of segment coils are respectively disposed in a plurality of layers arranged in a line in a radial direction in the slot,
the plurality of segment coils include a first segment coil disposed in a predetermined slot and a second segment coil disposed in an adjacent slot adjacent to the predetermined slot, each of the first segment coil and the second segment coil includes:
a first region having a linear portion disposed in the slot and a projection protruding from one end side of the linear portion to an outside of the slot, and
a second region formed to extend from another end side of the linear portion toward one side in the circumferential direction and change in a position in the radial direction outside the slot on the other end side of the linear portion, and
a second end that is a tip of the second region of the first segment coil is disposed to be adjacent to a first end that is a tip of the first region of the second segment coil disposed in a same layer as a layer of the first segment coil in the radial direction, and is connected to the first end of the second segment coil, wherein
the first segment coil is disposed in a predetermined layer of the predetermined slot,
the second segment coil is disposed in an adjacent layer adjacent to the predetermined layer of the predetermined slot,
the second segment coil is disposed in the predetermined layer of the adjacent slot,
the first segment coil is disposed in the adjacent layer of the adjacent slot, and
the second region of the first segment coil disposed in the predetermined layer of the predetermined slot is formed to extend toward one side in the circumferential direction and change in a position in the axial direction to cause the second end of the first segment coil to be disposed on an axial outside of the second region of the first segment coil disposed in the adjacent layer of the adjacent slot.

2. The rotating electrical machine according to claim 1, wherein the first segment coil and the second segment coil are each an L-shaped single component.

3. The rotating electrical machine according to claim 1, wherein in the first segment coil and the second segment coil, a thickness in the radial direction is smaller than a width in the circumferential direction or an axial direction in a cross section orthogonal to an energization direction.

4. The rotating electrical machine according to claim 1, wherein in the first segment coil and the second segment coil, a width of a portion disposed in the slot is different from a width of a coil end disposed outside the slot in a cross section orthogonal to an energization direction.

5. The rotating electrical machine according to claim 1, further comprising a conductive portion that connects the second end of the first segment coil to the first end of the second segment coil, wherein the conductive portion is at least one of
a linear conductive portion located at axial ends of the first segment coil and the second segment coil and linearly extending in the circumferential direction, and
a planar conductive portion located at axial ends of the first segment coil and the second segment coil and connecting facing surfaces of the second end of the first segment coil and the first end of the second segment coil to each other.

6. The rotating electrical machine according to claim 5, wherein the conductive portion includes at least any one of a conductive paste, a conductive sheet, a conductive adhesive, and metal plating.

7. The rotating electrical machine according to claim 1, wherein at least two of the plurality of segment coils disposed in the predetermined slot have a same shape.

8. The rotating electrical machine according to claim 1, wherein a protrusion protruding in the circumferential direction is formed in the linear portion of the segment coil.

9. The rotating electrical machine according to claim 1, wherein a plurality of protruding portions are formed in the second region of the segment coil.

10. The rotating electrical machine according to claim 1, wherein the second region of the segment coil changes in a position in the radial direction between the linear portion and the second end due to a bent portion being formed.

11. The rotating electrical machine according to claim 1, wherein
the first segment coil and the second segment coil are alternately connected in the circumferential direction for each of the plurality of layers to form a wavy coil in which a crest portion protruding in one axial direction and a valley portion protruding in another axial direction are alternately disposed in the circumferential direction at both ends of the coil end, and
crest portions and valley portions of a plurality of the wavy coils are alternately disposed in the radial direction.

12. The rotating electrical machine according to claim 1, wherein the slot has a semi-closed slot shape.

13. An electric wheel comprising the rotating electrical machine according to claim 1, wherein the rotating electrical machine is directly connected to a wheel without using a gear.

14. A vehicle comprising:
the rotating electrical machine according to claim 1;
a battery; and
a power conversion device that converts DC power of the battery into AC power and supplies the AC power to the rotating electrical machine, wherein torque of the rotating electrical machine is transmitted to vehicle wheels.

* * * * *